US 9,464,768 B2

(12) United States Patent
Stein

(10) Patent No.: US 9,464,768 B2
(45) Date of Patent: Oct. 11, 2016

(54) COLLIMATING LIGHT HEAD INCLUDING BASE WITH PROJECTING DOME-LIKE LENS

(71) Applicant: Code 3, Inc., St. Louis, MO (US)

(72) Inventor: Paul L. Stein, O'Fallon, MO (US)

(73) Assignee: Code 3, Inc., St. Louis, MO (US)

( * ) Notice: Subject to any disclaimer, the term of this patent is extended or adjusted under 35 U.S.C. 154(b) by 205 days.

(21) Appl. No.: 14/191,671

(22) Filed: Feb. 27, 2014

(65) Prior Publication Data

US 2014/0268723 A1      Sep. 18, 2014

Related U.S. Application Data

(60) Provisional application No. 61/781,736, filed on Mar. 14, 2013.

(51) Int. Cl.
| | |
|---|---|
| *F21V 5/00* | (2015.01) |
| *F21K 99/00* | (2016.01) |
| *F21S 8/10* | (2006.01) |
| *G02B 19/00* | (2006.01) |

(52) U.S. Cl.
CPC .............. *F21K 9/50* (2013.01); *F21S 48/236* (2013.01); *F21S 48/24* (2013.01); *G02B 19/0061* (2013.01)

(58) Field of Classification Search
CPC ............ F21S 48/1154; F21S 48/1241; F21S 48/1258; F21S 48/1329; F21S 48/215; F21S 48/225; F21S 48/236; F21S 48/24; F21K 9/50; G02B 19/0061
USPC ....... 362/336, 337, 235, 309, 327, 346, 518, 362/522, 545, 218
See application file for complete search history.

(56) References Cited

U.S. PATENT DOCUMENTS

| | | | |
|---|---|---|---|
| 2,254,961 A | * | 9/1941 | Harris ................ F21S 48/1329 359/718 |
| 5,101,326 A | | 3/1992 | Roney |
| 5,173,810 A | | 12/1992 | Yamakawa |
| 5,580,156 A | | 12/1996 | Suzuki et al. |
| 5,757,557 A | | 5/1998 | Medvedev et al. |
| 5,785,418 A | | 7/1998 | Hochstein |

(Continued)

FOREIGN PATENT DOCUMENTS

| | | |
|---|---|---|
| DE | 19728354 A1 | 1/1999 |
| DE | 102010056313 A1 | 6/2012 |

(Continued)

OTHER PUBLICATIONS

911Emergency Products Inc., "TD30 and WL30," 911ep.com, Jul. 31, 2001, 2 pages.

(Continued)

*Primary Examiner* — Peggy Neils
*Assistant Examiner* — Tsion Tumebo

(57) ABSTRACT

A light head includes a heat sink, a circuit board in heat transfer communication with the heat sink, a light source mounted on the circuit board such that heat generated by the light source when energized is transferred to via the circuit board to the heat sink, a collimating base having a cavity for receiving the light source, and a collimating lens structure on the outer surface of the base projecting outward from the outer surface of the base for transmitting substantially collimated light from the base. A light bar including one or more such light heads is also described.

15 Claims, 39 Drawing Sheets

(56) References Cited

U.S. PATENT DOCUMENTS

| | | | |
|---|---|---|---|
| 5,857,767 A | 1/1999 | Hochstein | |
| 6,158,882 A | 12/2000 | Bischoff et al. | |
| 6,183,100 B1 | 2/2001 | Suckow et al. | |
| 6,367,949 B1 | 4/2002 | Pederson | |
| 6,380,865 B1 | 4/2002 | Pederson | |
| 6,424,269 B1 | 7/2002 | Pederson | |
| 6,429,581 B1 | 8/2002 | Trentelman | |
| 6,461,008 B1 | 10/2002 | Pederson | |
| 6,462,669 B1 | 10/2002 | Pederson | |
| 6,469,631 B1 | 10/2002 | Pederson | |
| 6,472,996 B1 | 10/2002 | Pederson | |
| 6,543,911 B1 | 4/2003 | Rizkin et al. | |
| 6,552,658 B1 | 4/2003 | Roller et al. | |
| 7,160,010 B1* | 1/2007 | Chinniah | F21S 48/215 362/511 |
| 7,416,322 B2* | 8/2008 | Tanaka | F21K 9/00 362/288 |
| 7,837,370 B2* | 11/2010 | Bierhuizen | G02B 6/0028 257/100 |
| 7,841,750 B2* | 11/2010 | Wilcox | F21S 8/081 362/309 |
| 8,256,931 B2* | 9/2012 | Seward | F21K 9/00 362/231 |
| 8,891,171 B2* | 11/2014 | Choquet | F21V 5/04 264/478 |
| 2002/0097163 A1 | 7/2002 | Pederson | |
| 2002/0101356 A1 | 8/2002 | Pederson | |
| 2002/0149312 A1 | 10/2002 | Roberts et al. | |
| 2003/0031028 A1* | 2/2003 | Murray | B60Q 1/2696 362/545 |
| 2005/0024744 A1* | 2/2005 | Falicoff | G02B 3/04 359/737 |
| 2005/0135109 A1 | 6/2005 | Stout | |
| 2005/0190564 A1* | 9/2005 | Amano | F21S 48/215 362/336 |
| 2005/0265041 A1* | 12/2005 | Wimbert | F21S 48/215 362/545 |
| 2008/0106903 A1 | 5/2008 | King | |
| 2009/0290371 A1* | 11/2009 | Yagi | F21S 48/1154 362/518 |
| 2010/0073948 A1 | 3/2010 | Stein et al. | |
| 2010/0110660 A1* | 5/2010 | Brukilacchio | B60Q 1/2611 362/84 |
| 2010/0157616 A1 | 6/2010 | Nakada | |

FOREIGN PATENT DOCUMENTS

| | | |
|---|---|---|
| EP | 1043189 A2 | 10/2000 |
| EP | 1698824 A2 | 9/2006 |
| EP | 2194311 A2 | 6/2010 |
| JP | 2001-326703 | 11/2001 |
| JP | 2002-301027 | 10/2002 |
| WO | 00/71417 A1 | 11/2000 |
| WO | 03/048637 A1 | 6/2003 |
| WO | 20101036755 A1 | 4/2010 |

OTHER PUBLICATIONS

911Emergency Products Inc., "TD56 and WL56," 911ep.com, Jul. 31, 2001, 2 pages.

911EMERGENCY Products Inc., "Millenium Led Light Bar," 911ep.com, Jul. 31, 2001, 2 pp.

Lumileds, "LumiLeds' Power Light Source Selected as the Light Source for Emergency Vehicle Lighting Solutions," Lumileds.com News, Oct. 23, 2000, 2 pages.

Lumileds, "Preliminary Technical Data, Luxeon Line Power Light Sources," Mar. 2001, 8 pages.

Lumileds, "Preliminary Application Note P01, LumiLeds Custom Luxeon Power Light Source Design Guide," Mar. 2001, 20 pages.

* cited by examiner

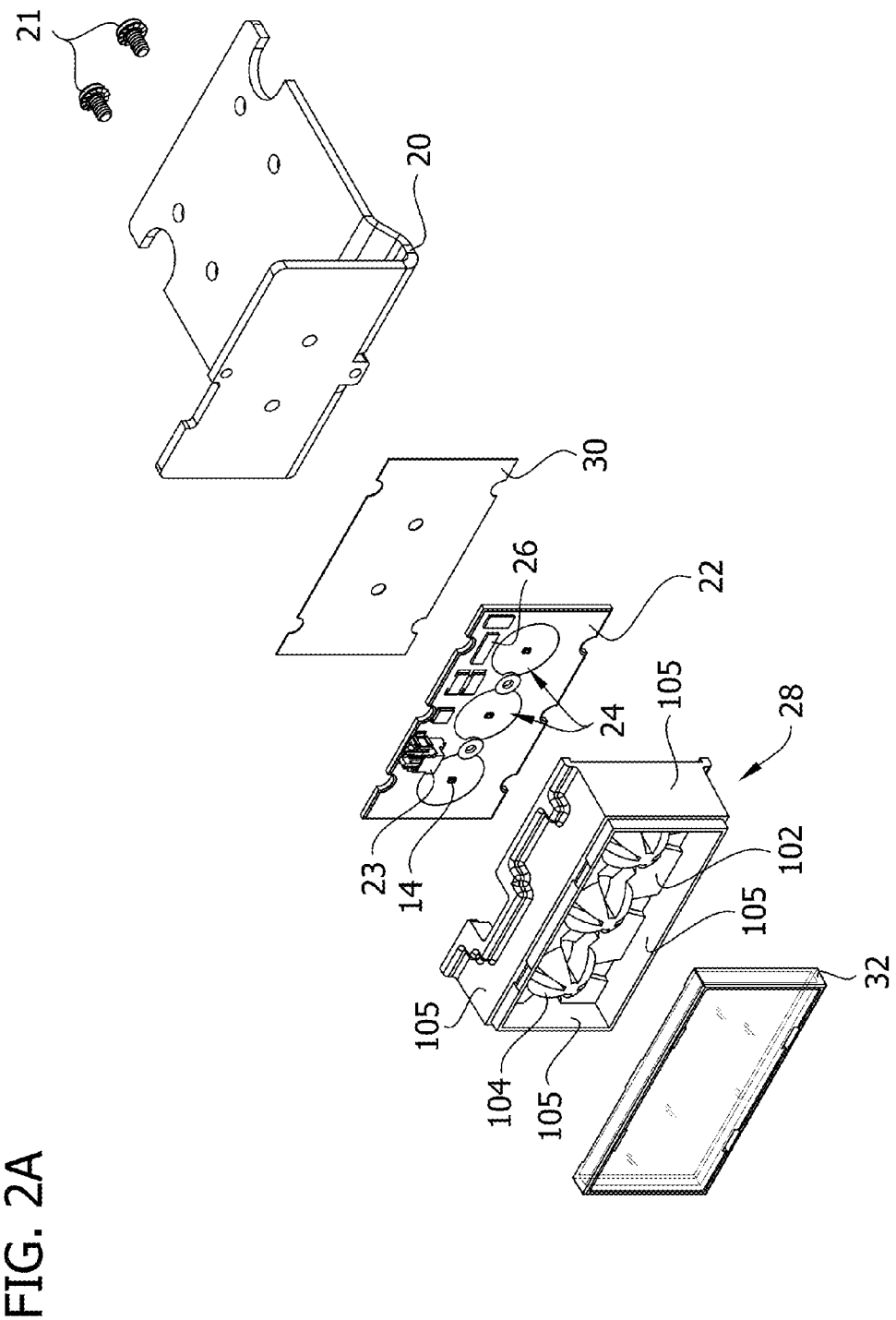

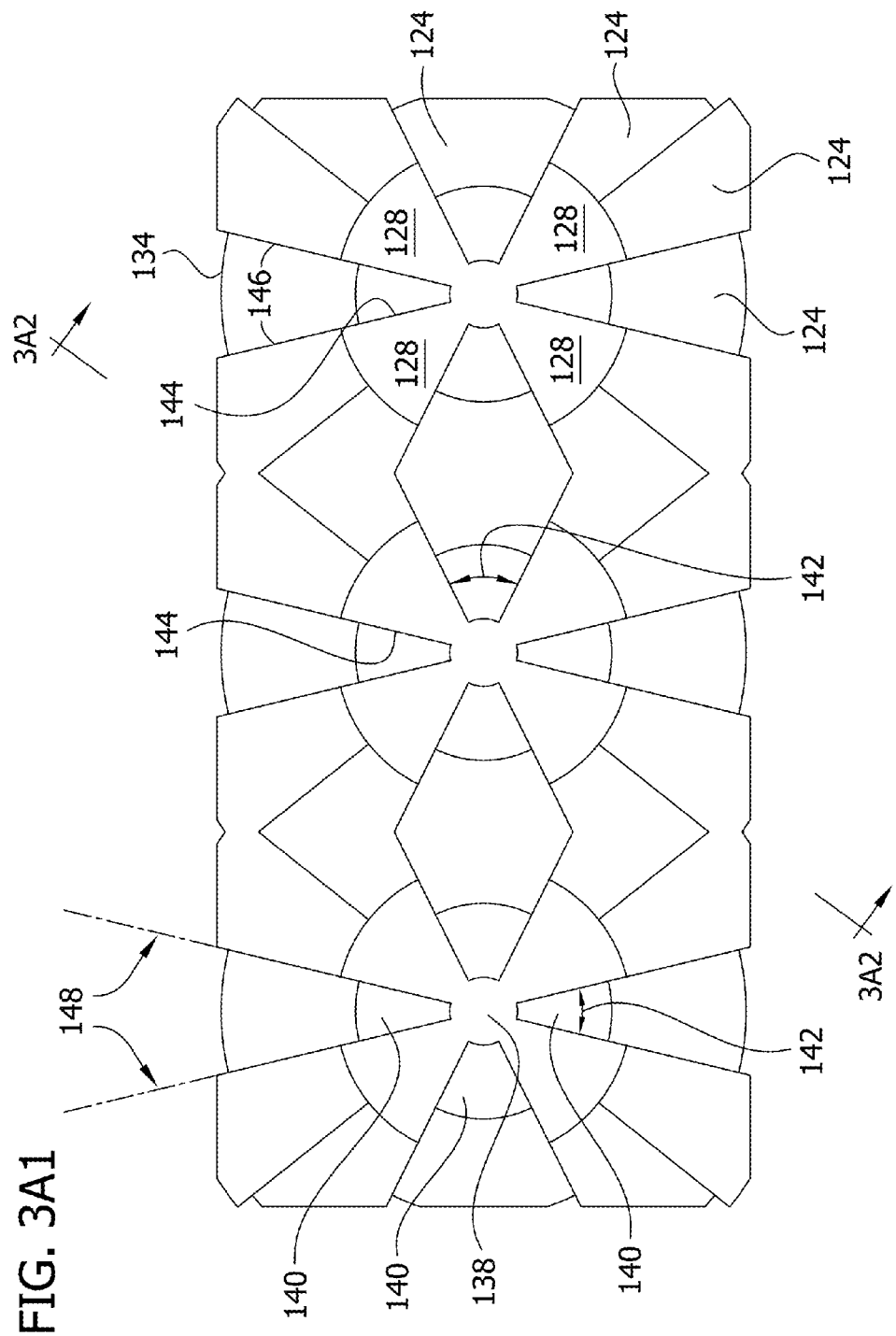
FIG. 3A1

FIG. 3A2
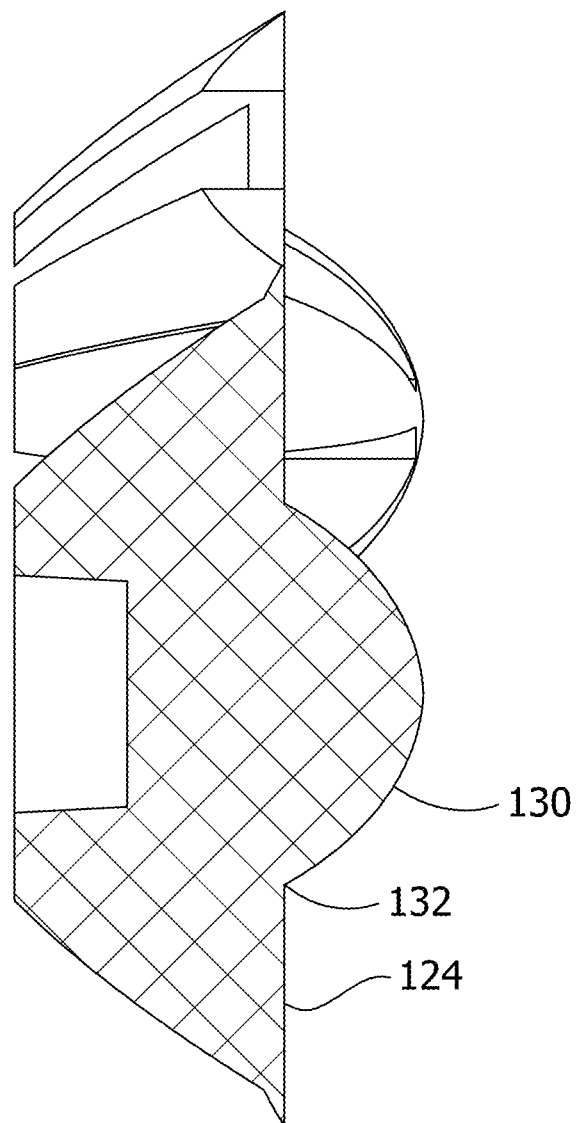

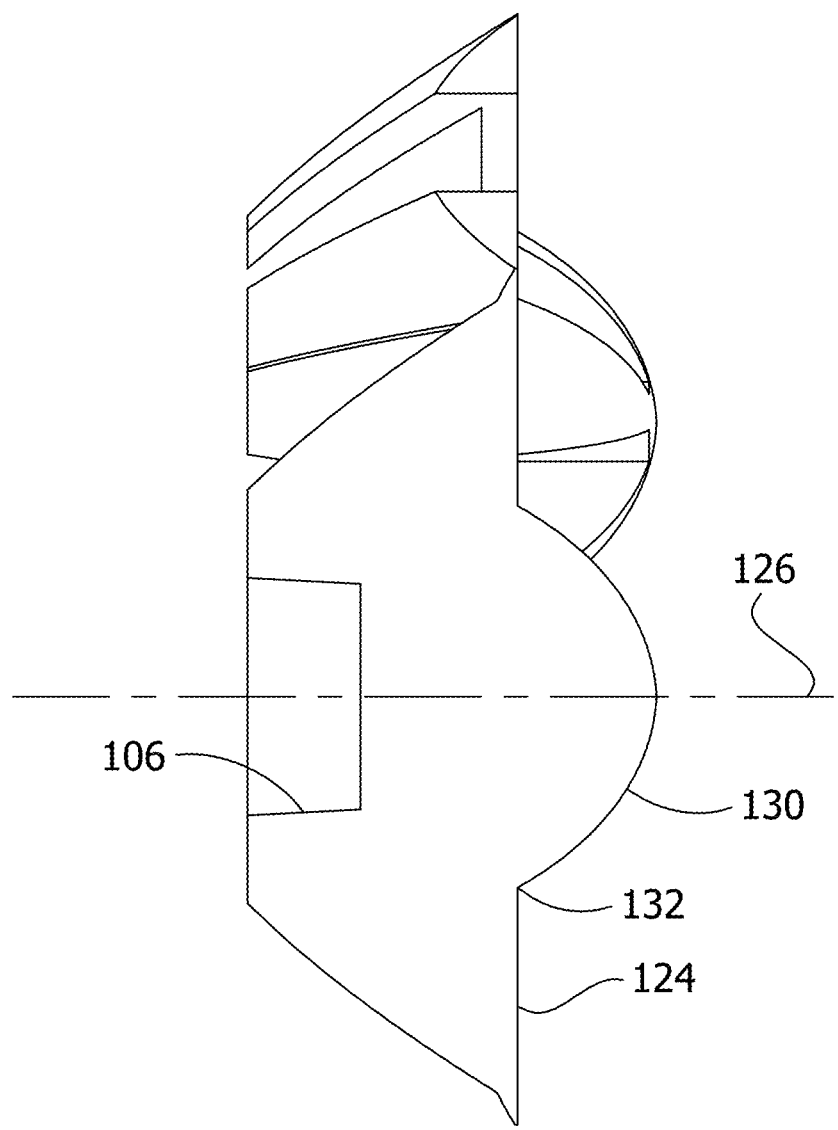
FIG. 3A3

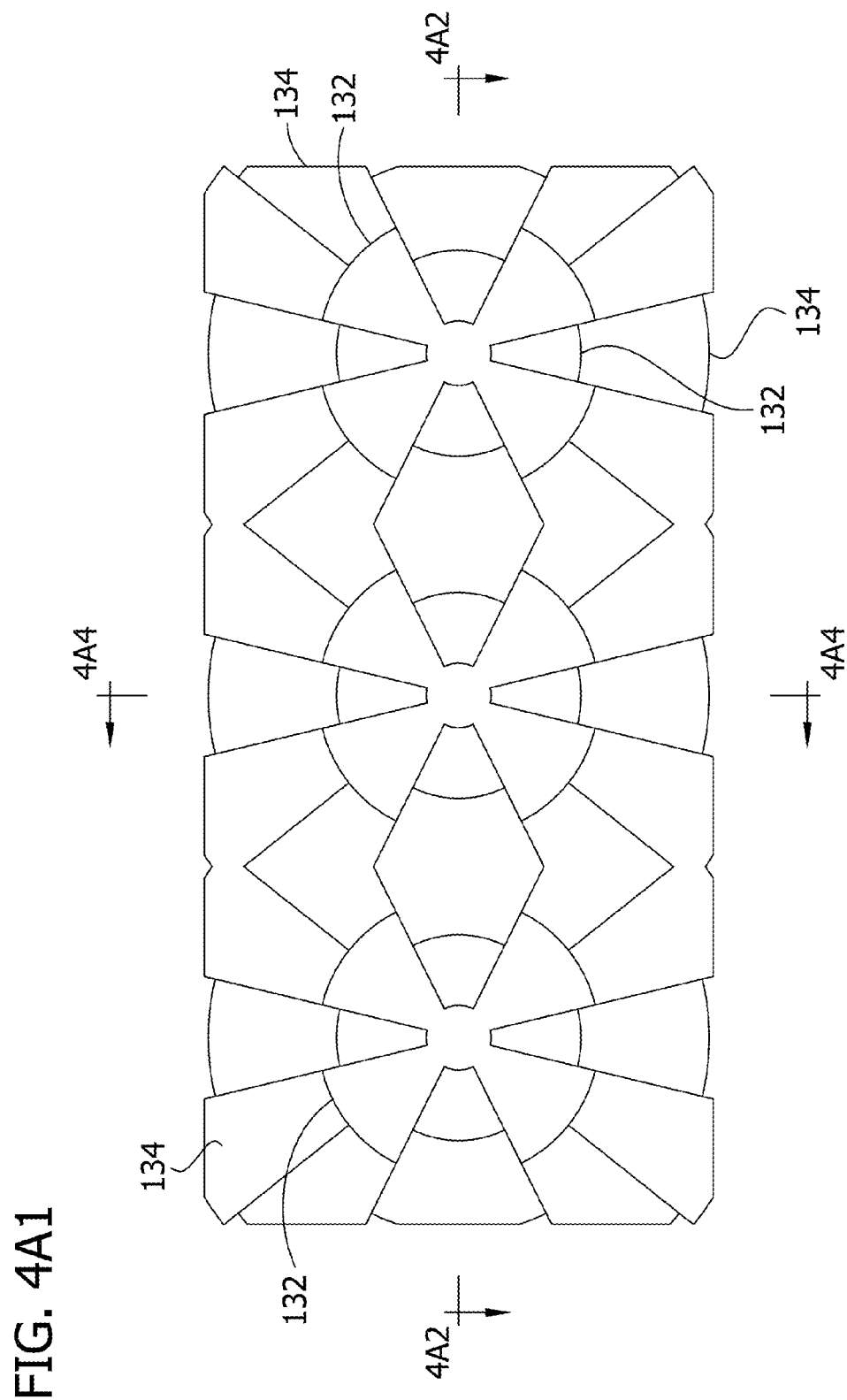
FIG. 4A1

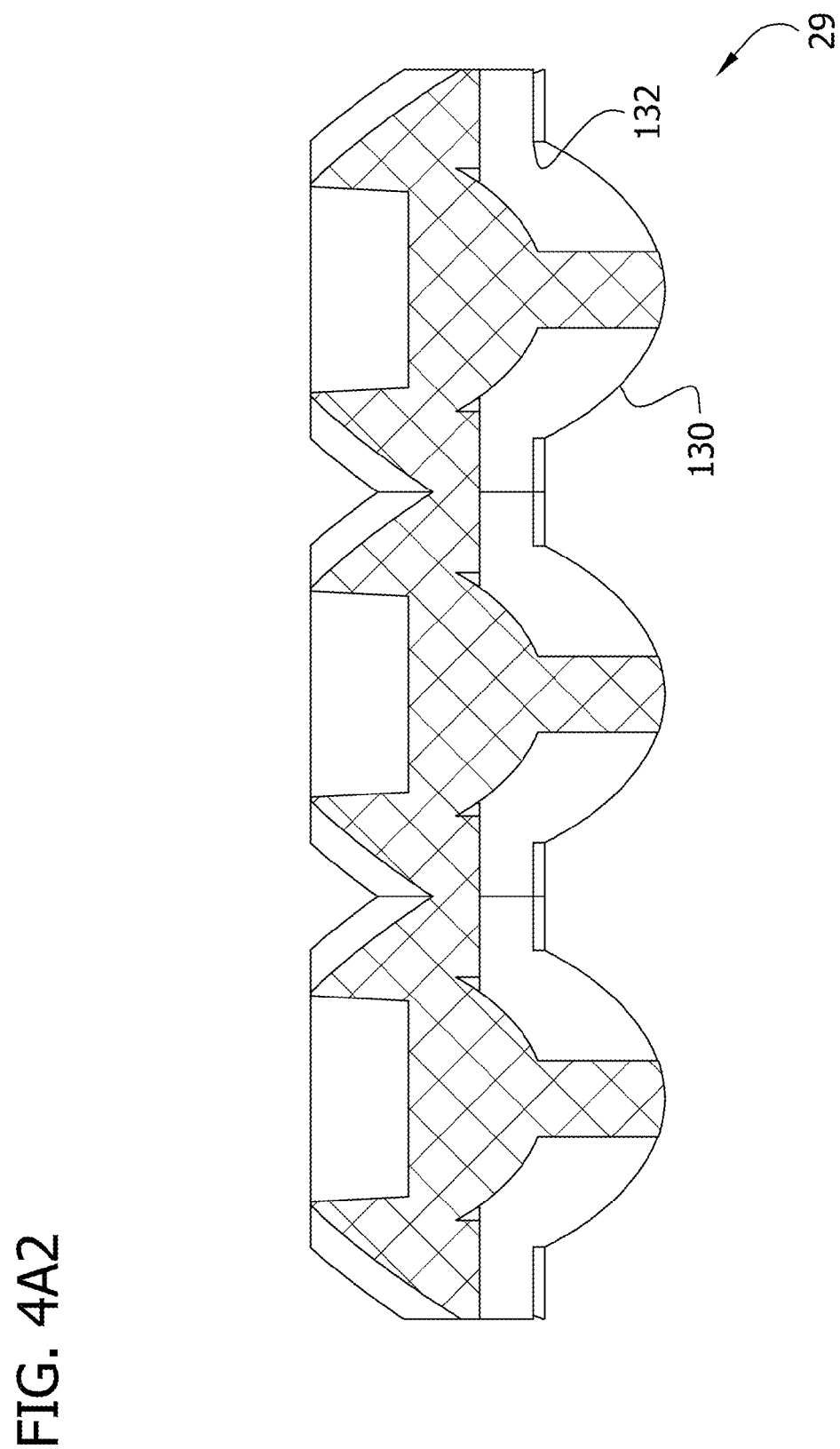
FIG. 4A2

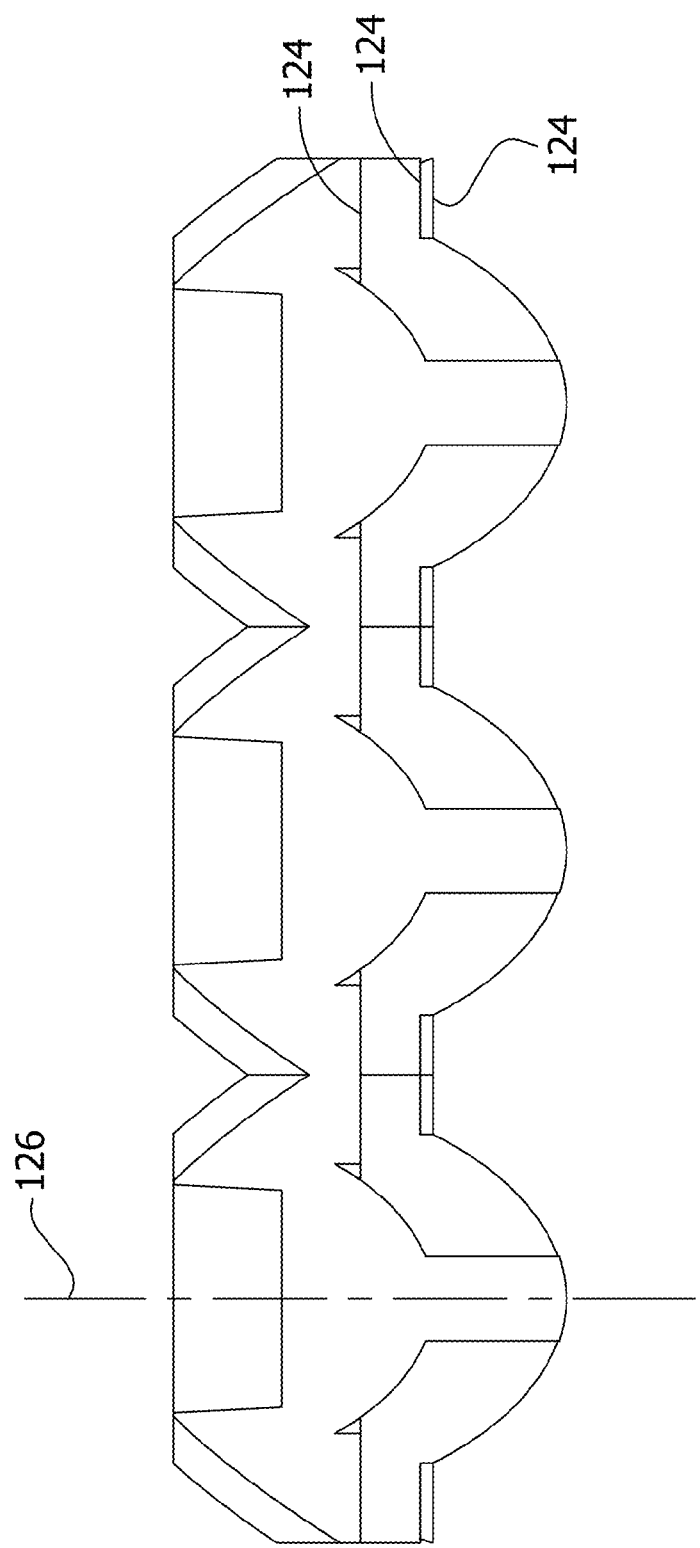
FIG. 4A3

FIG. 4A4
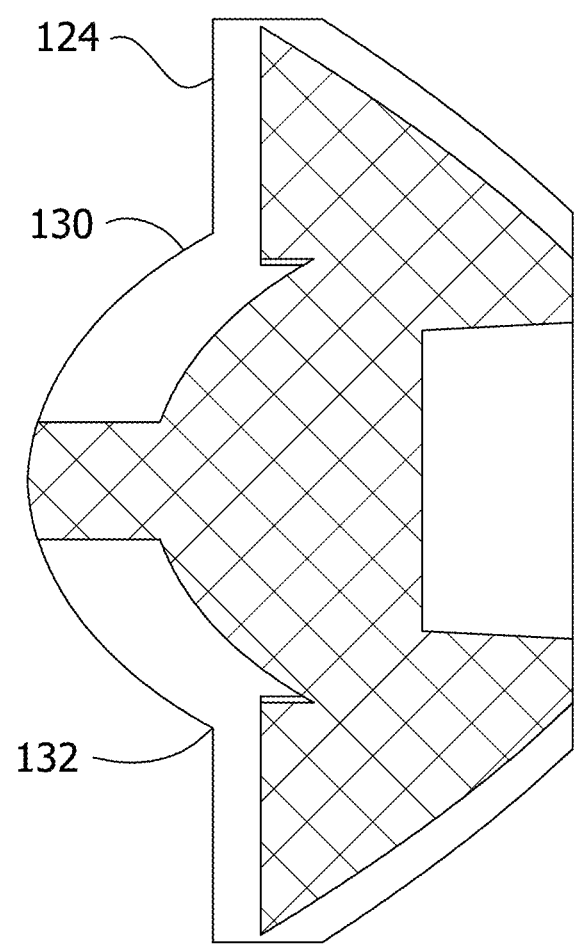

FIG. 4A5
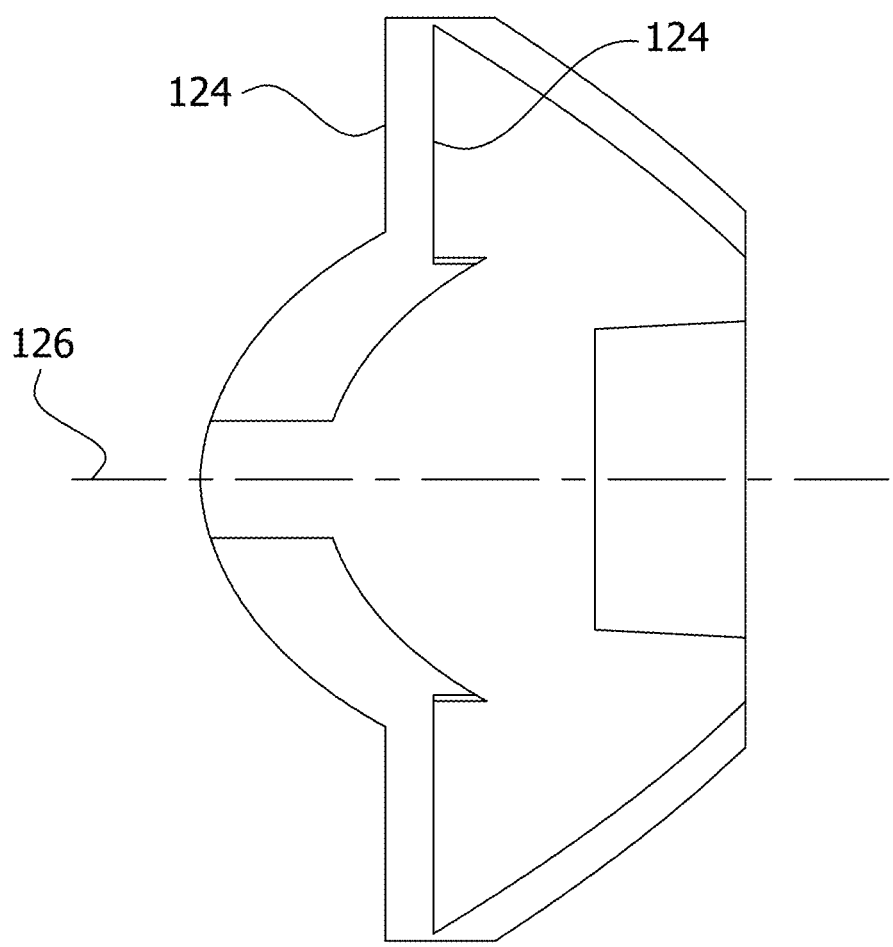

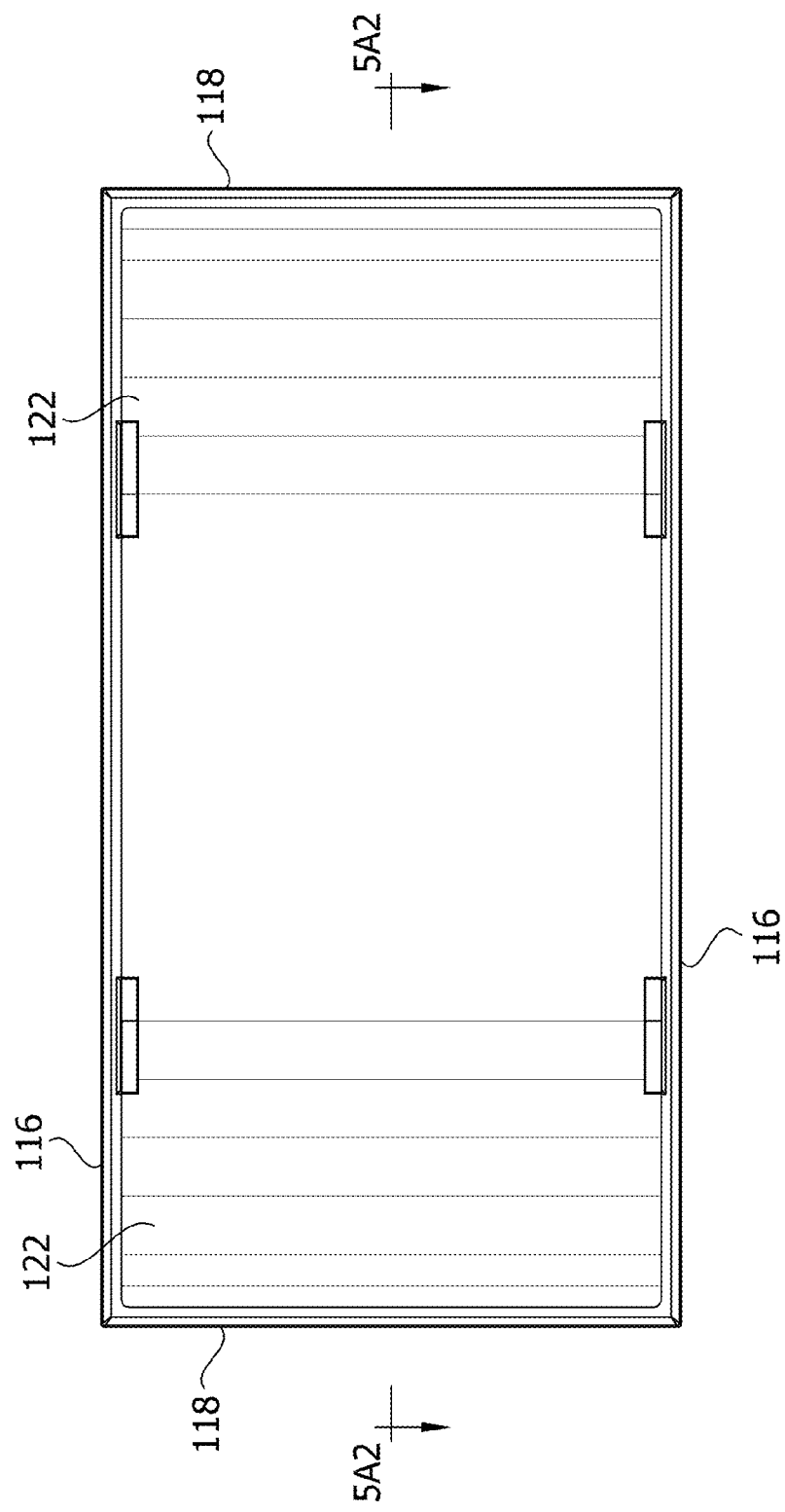
FIG. 5A1

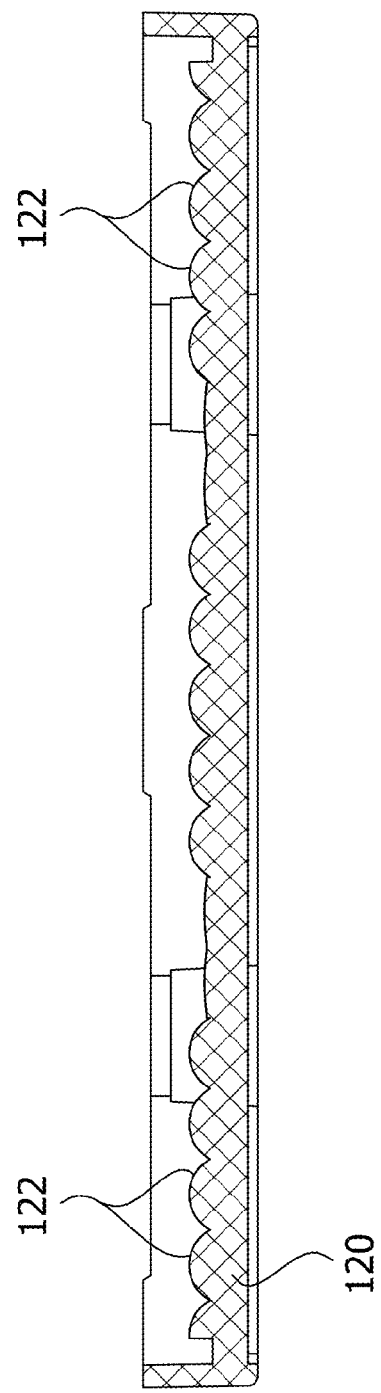
FIG. 5A2

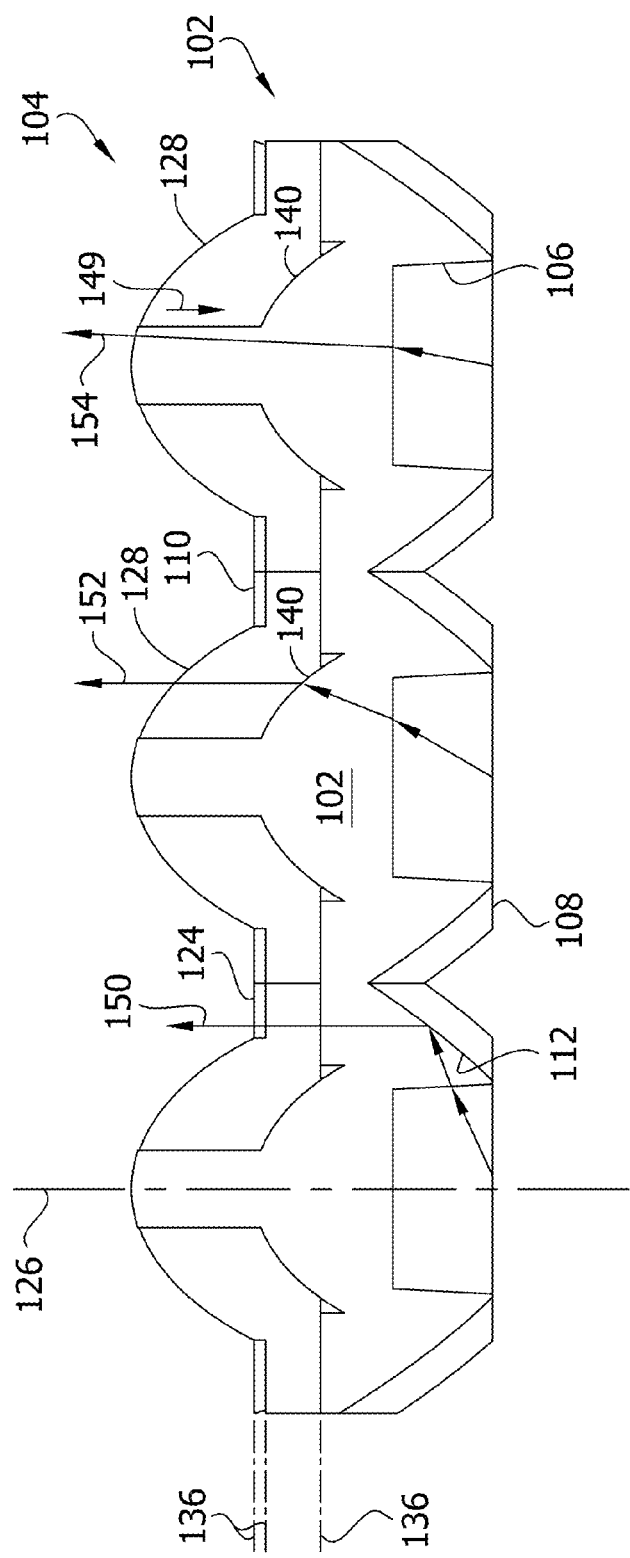

COLLIMATING LIGHT HEAD INCLUDING BASE WITH PROJECTING DOME-LIKE LENS

BACKGROUND

The present invention generally relates to a light bar.

Warning light signals are generally used to clear the right of way or to warn oncoming motorists of potential moving or stationary hazards, such as a vehicle that is stopped or a vehicle moving slower or faster than the rate of traffic. Warning light signals may also be used to provide specific directions to motorists, such as merge right or merge left or pull over. Some vehicles incorporate an arrow board or even a text matrix display to generate warning light signals to direct traffic.

The use of emergency beacons is restricted by law in many jurisdictions only for responding to an emergency, initiating a traffic stop, bona fide training exercises, or when a specific hazard exists in the road.

Co-owned U.S. Pat. No. 8,342,725 for a light bar including chip-on-board (COB) light emitting diode (LED) is incorporated herewith by reference in its entirety.

SUMMARY

In one form, a light head includes a heat sink, a circuit board in heat transfer communication with the heat sink, a light source mounted on the circuit board such that heat generated by the light source when energized is transferred to via the circuit board to the heat sink, a collimating base having a cavity for receiving the light source, and a collimating lens structure on the outer surface of the base projecting outward from the outer surface of the base for transmitting substantially collimated light from the base. A light bar including one or more such light heads is also described.

Other objects and features will be in part apparent and in part pointed out hereinafter.

BRIEF DESCRIPTION OF THE DRAWINGS

FIG. 2A is an exploded view of an embodiment of one of the light heads;

FIG. 3A1 illustrates a top plan view of an embodiment of a base 102 and a lens structure 104; FIG. 3A2 is a cross-sectional view along diagonal section line 3A2-3A2 of FIG. 3A1 with a cross hatch pattern; and FIG. 3A3 is a cross-sectional view along diagonal section line 3A2-3A2 of FIG. 3A1 without a cross hatch pattern;

FIG. 4A1 illustrates a top plan view of the base 102 and lens structure 104 of FIG. 3A1; FIG. 4A2 is a cross-sectional view along section line 4A2-4A2 of FIG. 4A1 with a cross hatch pattern; FIG. 4A3 is a cross-sectional view along section line 4A2-4A2 of FIG. 4A1 without a cross hatch pattern; FIG. 4A4 is a cross-sectional view along section line 4A4-4A4 of FIG. 4A1 with a cross hatch pattern; and FIG. 4A5 is a cross-sectional view along section line 4A4-4A4 of FIG. 4A1 without a cross hatch pattern;

FIG. 5A1 illustrates a top plan view of one embodiment of a fluted lens 120; FIG. 5A2 is a cross-sectional view along section line 5A2-5A2 of FIG. 5A1 with a cross hatch pattern;

FIG. 6A corresponds to section 4A2-4A2 of FIG. 4A1 without a cross hatch pattern and including arrows indicating reflected and transmitted light rays;

Corresponding reference characters indicate corresponding parts throughout the drawings.

DETAILED DESCRIPTION

Figure 1:
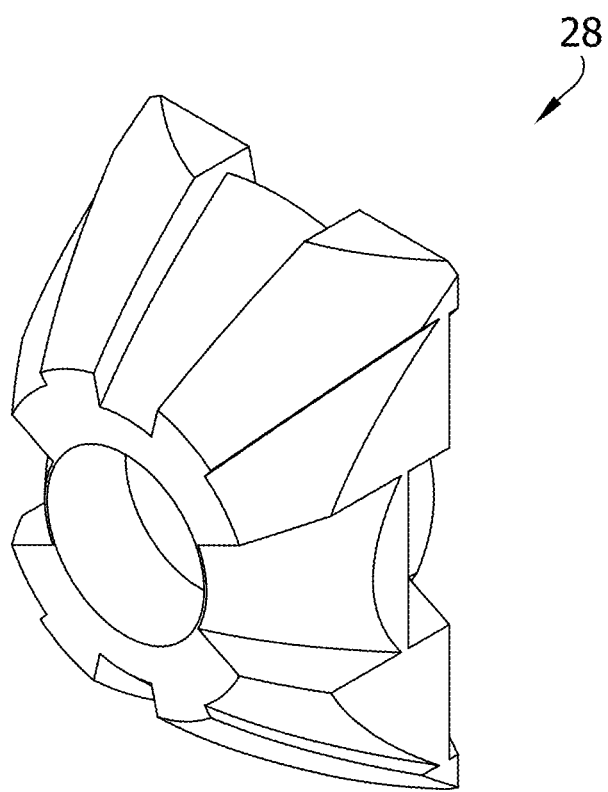
FIG. 1 is a back perspective view of an embodiment of an optic component 28 of a light head.
Figure 1A:
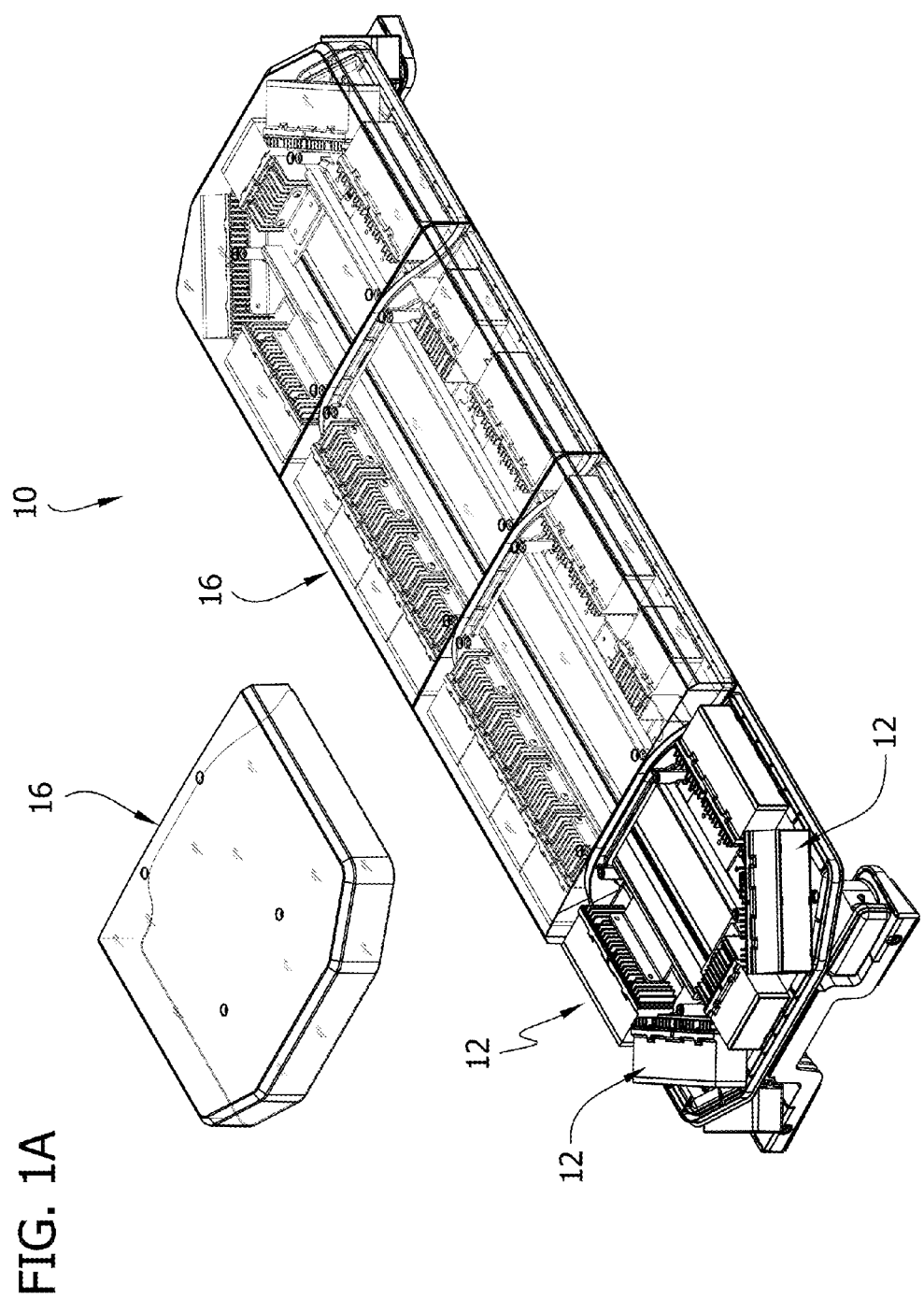
FIG. 1A is a perspective of an embodiment of a light bar including a plurality of light heads.

Referring to FIG. 1A, one embodiment of a light bar 10 generally comprises at least one light head 12, a housing, generally indicated at 16, enclosing the light head 12, and a microcontroller and power supply circuit, not shown, in the housing to energize the light head 12 to create warning light signals when viewed by an observer remote from the light bar 10. In the illustrated embodiment, the light bar 10 comprises a plurality of such light heads 12, although it is understood that the light bar 10 may comprise a single light head 12 without departing from the scope of the present invention. In one embodiment the microcontroller is electrically connected to each of the light heads 12 so that the microcontroller controls each of the light heads.

Referring to FIG. 2A, each of the illustrated light heads 12 generally includes a heat sink 20, a circuit board 22 mounted on the heat sink 20 in thermal contact and in heat transfer communication therewith via a thermal transfer layer 30, at least one light source 24 on the circuit board, a light source driver circuit 26 on the board 22 in electrical communication with the microcontroller and the light source 24, and at least one optic component 28 for capturing and transmitting light emitted from the light source(s) 24. Optionally, an outer lens 32 covers the optic component 28 for transmitting light emitted therefrom. It is understood that in an alternate embodiment an independent microcontroller may be mounted on each board 22 to control the light sources 24 in the corresponding light head 12. The microcontroller is in communication with an input device, such as a keypad or control head (not shown) controlled by an operator.

Each light head 12 may include any number of defined light sources 24 on the circuit board 22. For example, in the illustrated embodiment the circuit board 22 is mounted in a vertical plane in the light bar 10, and the board 22 includes three light sources 24 arranged as a horizontal linear array comprising a horizontal row of the LEDs 14. In another embodiment, the circuit board 22 may be mounted in a vertical plane in the light bar 10, and a plurality of light sources 24 may be arranged in vertical linear array. In yet another embodiment, the circuit board 22 may be mounted in a vertical plane in the light bar 10, and a plurality of light sources 24 may be arranged in a 2D array having at least two columns and two rows.

In one form, the circuit board 22 has an electrically conductive pathway (not shown) and the light source 24 is mounted on the circuit board 22 such that heat generated by the light source 24 when energized is transferred to via the circuit board 22 and thermal transfer layer 30 to the heat sink 20. The light source 24 is electrically connected to the electrically conductive pathway of the circuit board 22.

Figure 6:
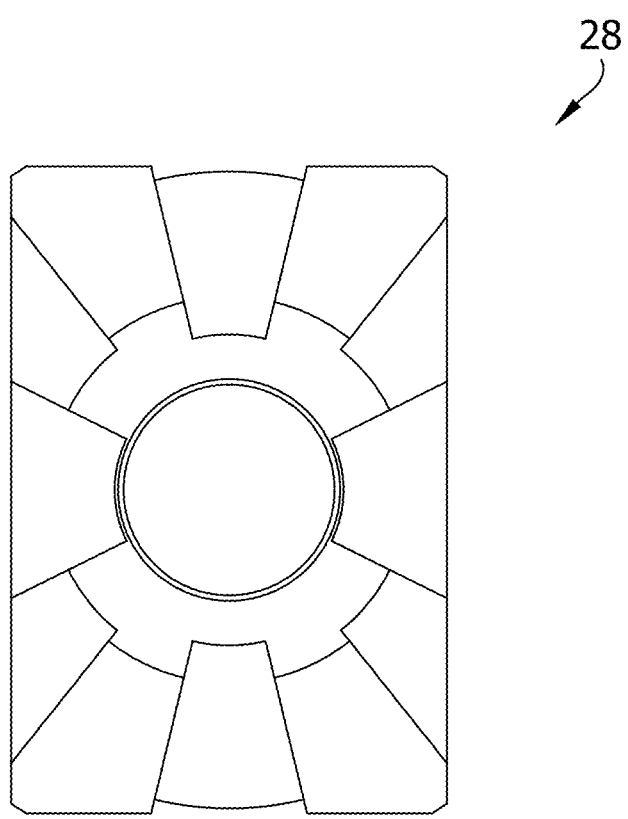
FIG. 6 is a rear elevation of the optic component 28 of FIG. 1.

In one form as shown in FIGS. 2A and 6A, the optic component 28 comprises a polycarbonate collimating base 102, a polycarbonate collimating lens structure 104 and a polycarbonate optic cover 105 enclosing the base and lens structure. The base 102 has a cavity 106 for receiving the light source 24. The base 102 includes an inner surface 108 adjacent the circuit board 22, an outer transmissive surface 110 for transmitting substantially collimated light generated by the light source 24, and interior surfaces 112 for reflecting light generated by the light source 24 toward the outer transmissive surface 110. In one form, the circuit board may include a machine applied SMT (surface mounted technology) connector 23 equipped with terminals and connector in place of hand soldered wires.

The collimating lens structure 104 on the outer surface 110 of the base 102 projects outward from the outer surface 110 of the base 102 for transmitting substantially collimated light from the base 102.

In one form as shown in FIGS. 2A, 5A1, 5A2, and 8A, the optional outer lens 32 is mounted to the optic cover 105 and comprises an inner surface 114 adjacent the collimating base 102 and the collimating lens structure 104 for transmitting the substantially collimated light emitted by the collimating base 102 and the collimating lens structure 104. The outer lens 32 has opposing sides 116 and opposing ends 118 and comprises at least one of a holographic, micro-optic elliptical diffuser (not shown) or a fluted lens 120 having parallel ribs 122 substantially perpendicular to the sides 116 of the outer lens 32. The fluted outer lens 32 enhances the appearance of the collimated beam of light emitted by the light source 24 and viewed by an observer remote from the light bar. The collimated beam is enhanced by appearing as a rectangular beam having a substantially constant, even intensity at various points within a plane perpendicular to the axis of the transmitted collimated beam. In one form, the collimating base 102, collimating lens structure 104, and optic cover 105 are molded as one piece that attaches with 4 screws (not shown).

Referring to FIGS. 2A, 3A3, and 6A, outer transmissive surface 110 of the collimating base 102 comprises planar regions 124 in one or more planes perpendicular to a central axis 126 of the collimating lens structure 104 extending generally perpendicular to the circuit board 22.

The collimating lens structure 104 comprises a generally dome-shaped structure, and in one form may be a hemisphere projecting from base 102.

In one form as shown in FIGS. 3A1, 3A3, and 6A, the collimating lens structure 104 includes a plurality of outer radial lens segments 128 at spaced apart locations arranged around the central axis 126 of the collimating lens structure 104 extending generally perpendicular to the circuit board 22. The outer radial lens segments 128 have outer surfaces 130 terminating in base edges 132 at the planar regions 124 of the outer transmissive surface 110 of the collimating base.

In one form, the planar region 124 of the outer transmissive surface 110 of the collimating base 102 comprise sector shaped regions 134 extending radially from the base edges 132 of the outer radial lens segments 128 in one or more planes 136 generally perpendicular to the central axis 126.

In one form, the collimating lens structure 104 comprises a generally cylindrical center portion 138 along the central axis 126 and inner radial lens segments 140 spaced inward of the outer radial lens segments 128 at spaced apart locations around the central axis 126. The inner radial lens segments 140 extend radially outwardly from the cylindrical central portion 138 in gaps 142 between the outer radial lens segments 128. The inner radial lens segments 140 are disposed between side walls 144 of the outer radial lens segments 128. The side walls 144 of the outer radial lens segments 128 are co-planar with side walls 146 of the inner radial lens segments 140. The side walls 144, 146 of both the outer radial lens segments 128 and the inner radial lens segments 140 lie in radial planes 148.

In one form as shown in FIGS. 3A1 and 6A, the collimating lens structure 104 comprises the generally cylindrical center portion 138 along the central axis 126, and the outer and inner radial lens segments 128, 140 extend radially outwardly from the cylindrical central portion 138. The inner radial lens segments 140 are positioned inward of the outer radial lens segments 128 as indicated by arrow 149 in FIG. 6A.

The substantially collimated light transmitted by the outer transmissive surface 110 of the collimating base 102 and the substantially collimated light transmitted by the collimating lens structure 104 form a generally collimated beam of light having a generally rectangular cross-section perpendicular to the central axis 126 of the collimated lens structure 104 extending generally perpendicular to the circuit board 22. (See FIGS. 9A, 9B and 10A).

In one form, the light source 24 comprises one or more light emitting diodes (LED) 14 mounted on the circuit board 22 such that heat generated by the LED 14 when energized is transferred to the heat sink 20. The LED 14 has an LED chip electrically connected to the electrically conductive pathway of the circuit board 22.

A plurality of LEDs 14 may be positioned within each cavity 106, the plurality of LEDs 14 when energized emitting light having different colors. In one form, the heat sink 20 may be a stamped aluminum sheet metal heat sink 20, which is less expensive and performs better than die cast aluminum. An optional ground connection 21 (e.g., metal screws) through the heat sink 20 to electrically engage an electrical ground path of the board 22 eliminates the need for a ground wire in the light bar harness and provides circuit board 22 contact with the heat sink 20. A light engine using an FR4 type PC board with high output Cree® prepackaged LEDs (XB-D and XT-E) (e.g., wire-bonded LEDs) may be used with the optic component 28 to provide greater performance and higher efficiency than many presently available COB die light engines. However, it is contemplated that COB light engines may be used with optic component 28 and would achieve improved efficiency and performance over presently available COB light heads. Also, the optic component 28 with wire bonded LEDs reduces individual light head and overall light bar cost as compared to presently available COB light heads.

Some advantages of at least some of the above include:
improved light output as compared to presently available COB device to maintain premium product status;
simplified light head assembly and tolerances to improve performance, efficiency and/or longevity;
simplified supply chain effort by using standard, off-the-shelf components.

Figure 2:
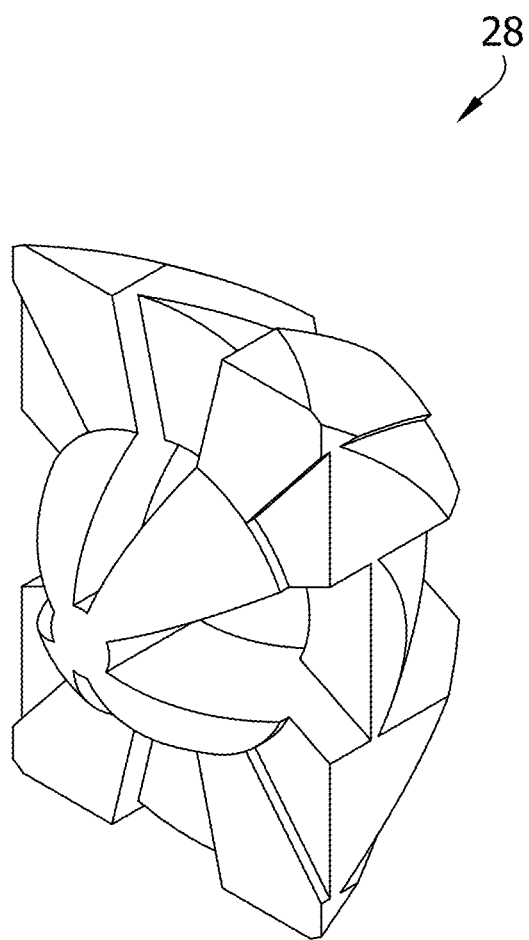
FIG. 2 is a front perspective of the optic component 28 of FIG. 1.
Figure 3:
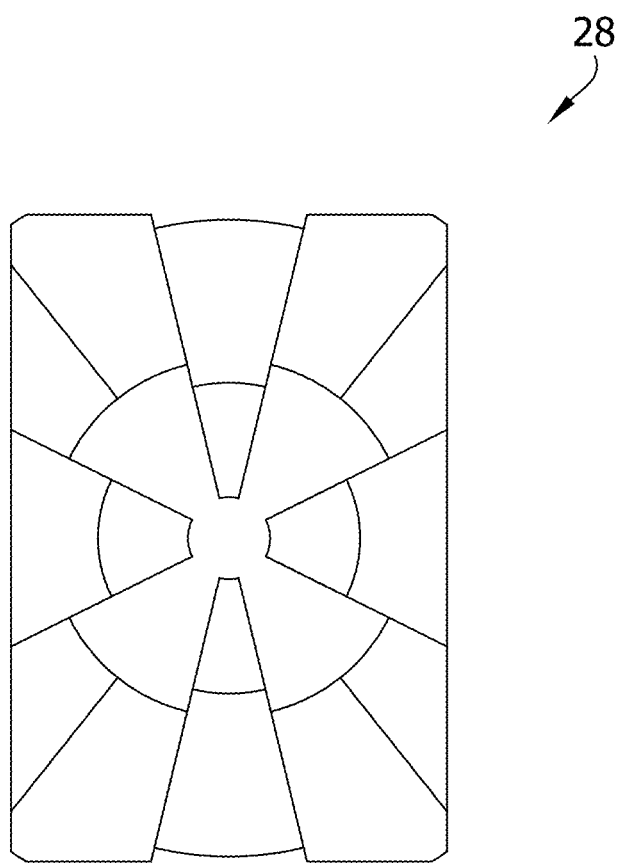
FIG. 3 is a front elevation of the optic component 28 of FIG. 1.
Figure 4:
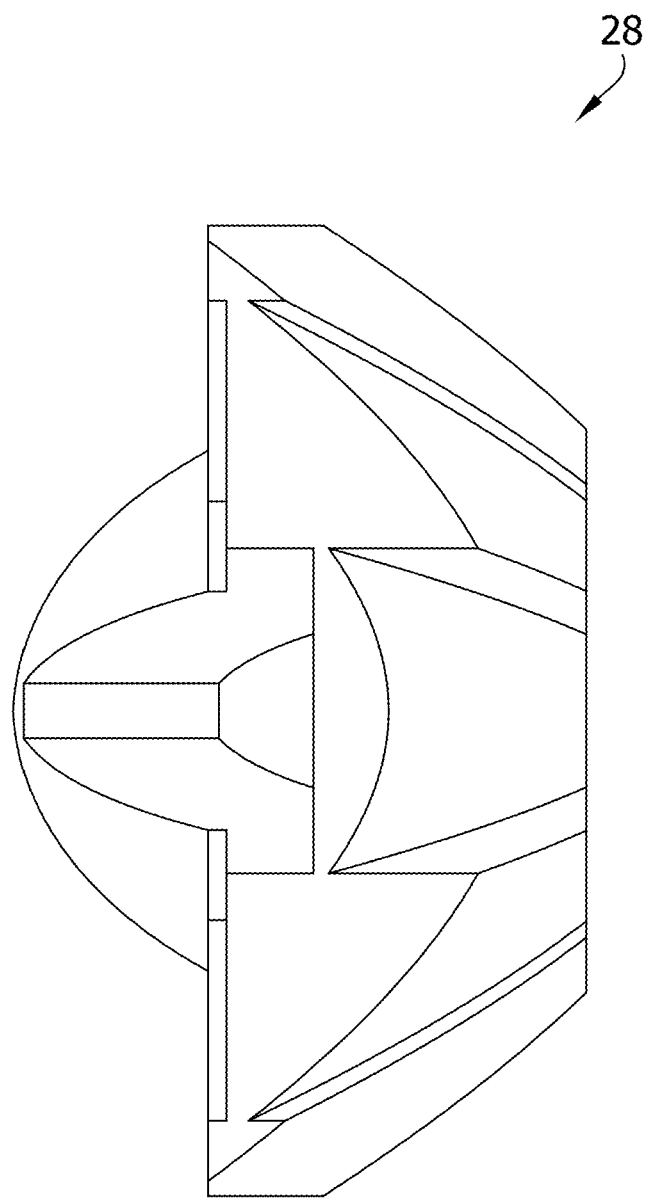
FIG. 4 is a side elevation showing the right side of the optic component 28 of FIG. 1, the left side being a mirror image of the right side.
Figure 5:
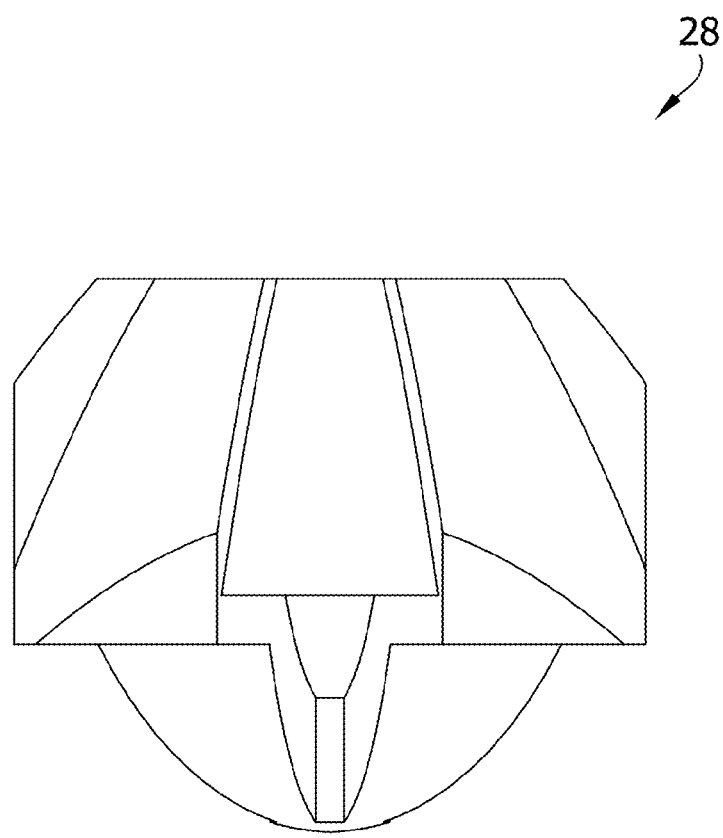
FIG. 5 is a top plan of the optic component 28 of FIG. 1, the bottom plan view being a mirror image of the top plan.
Figure 7:
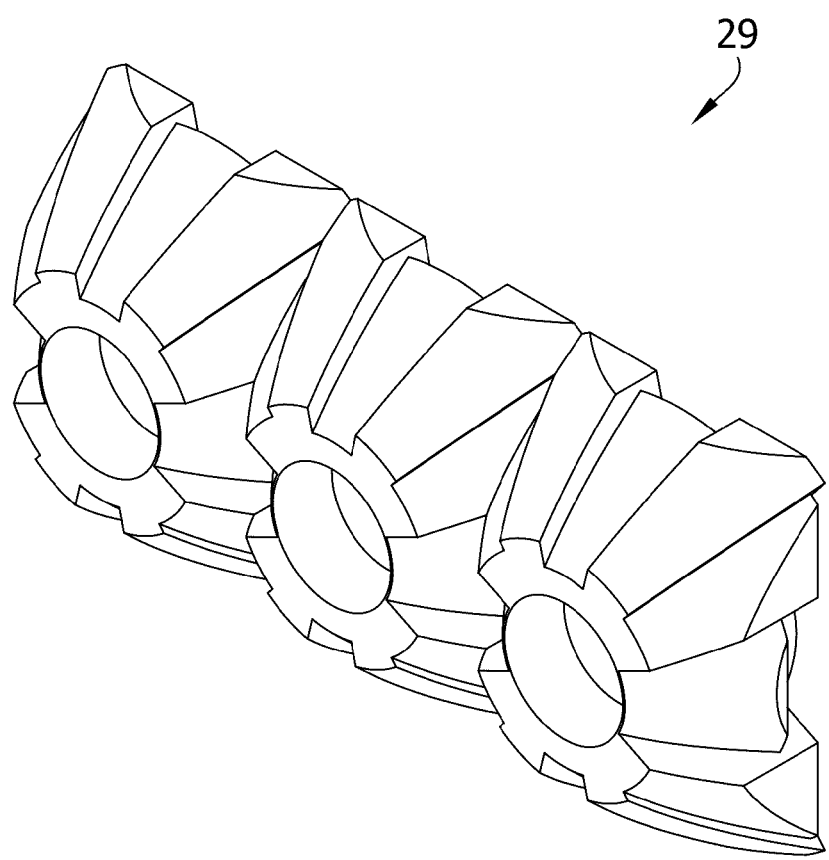
FIG. 7 is a back perspective view of an embodiment of a three optic component 29 of a light head.
Figure 7A:
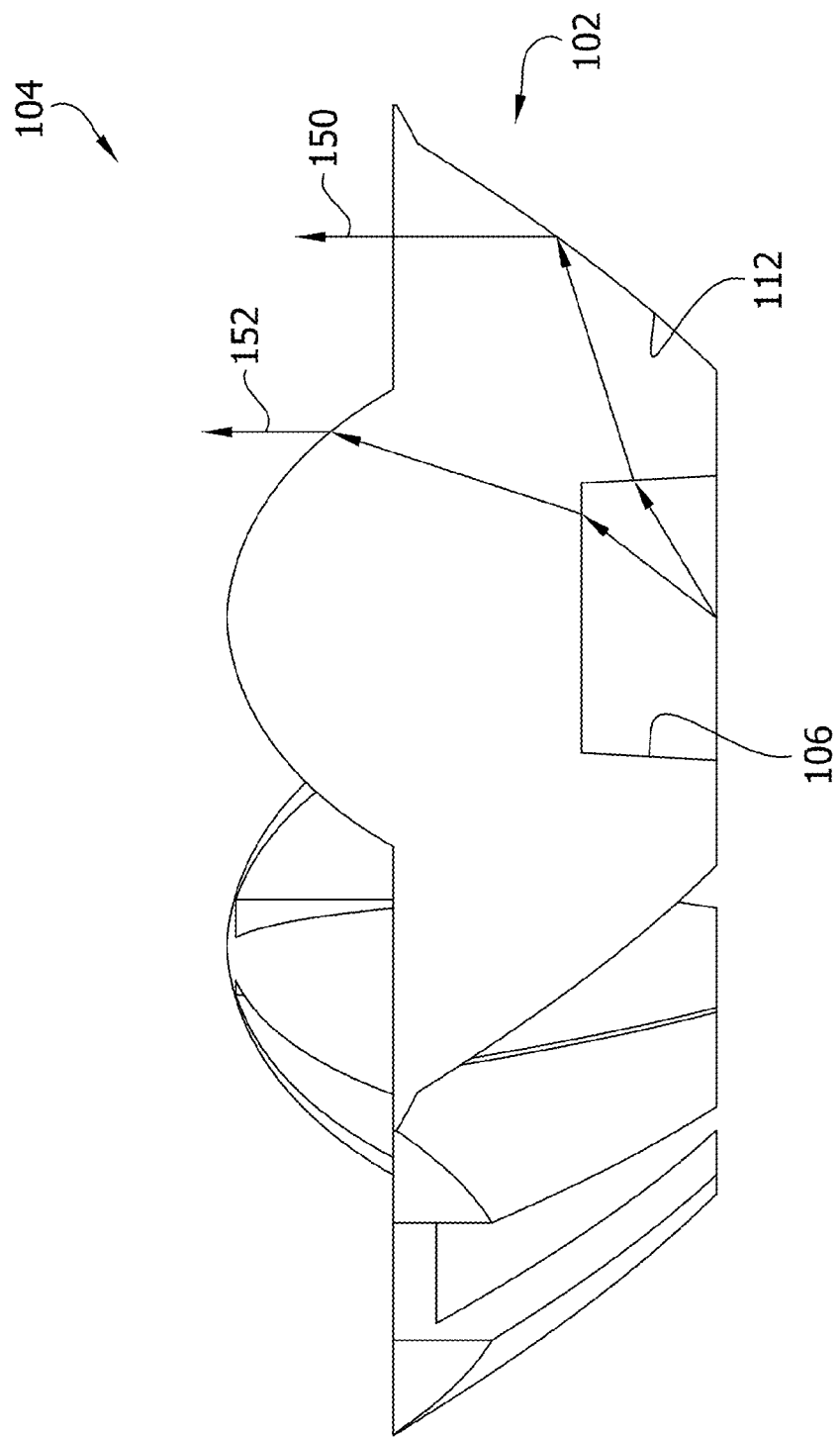
FIG. 7A corresponds to section 3A2-3A2 of FIG. 3A1 without a cross hatch pattern and including arrows indicating reflected and transmitted light rays.
Figure 8:
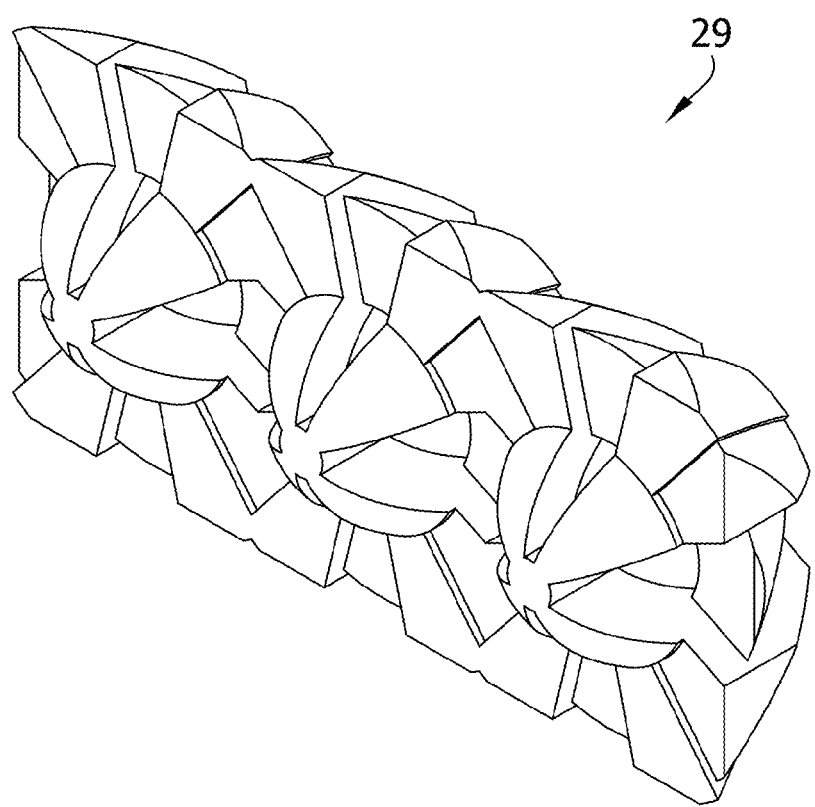
FIG. 8 is a front perspective of the three optic component 29 of FIG. 7.
Figure 8A:
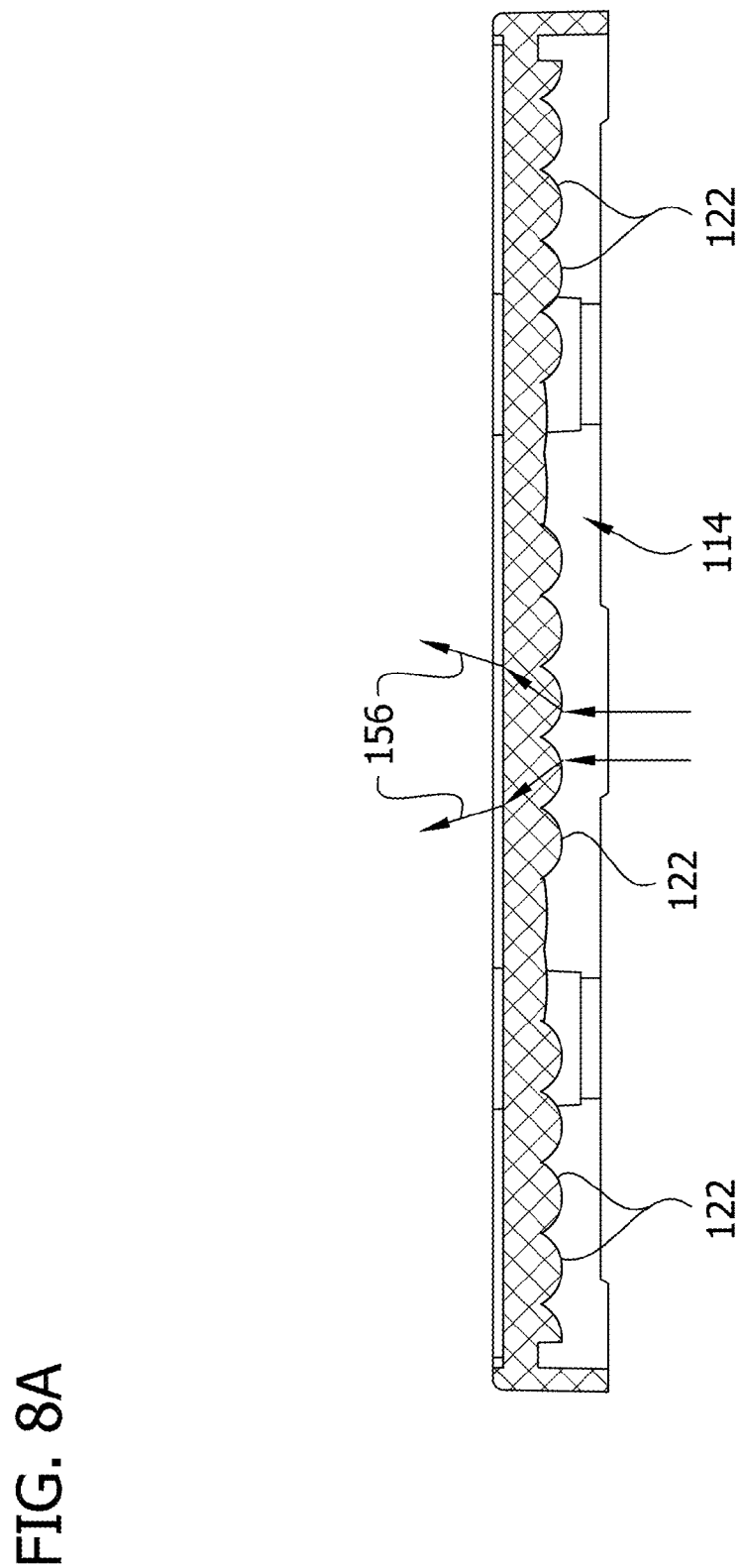
FIG. 8A corresponds to section 5A2-5A2 of FIG. 5A1 with a cross hatch pattern and including arrows indicating transmitted light rays.

FIG. 6A corresponds to section 4A2-4A2 of FIG. 4A1 without a cross hatch pattern and including arrows indicating reflected and transmitted light rays. FIG. 4A2 is a cross-sectional view along section line 4A2-4A2 of FIG. 4A1 with a cross hatch pattern. FIG. 4A3 is a cross-sectional view along section line 4A2-4A2 of FIG. 4A1 without a cross hatch pattern. FIG. 4A4 is a cross-sectional view along section line 4A4-4A4 of FIG. 4A1 with a cross hatch pattern. FIG. 4A5 is a cross-sectional view along section line 4A4-4A4 of FIG. 4A1 without a cross hatch pattern. FIG. 7A corresponds to section 3A2-3A2 of FIG. 3A1 without a cross hatch pattern and including arrows indicating reflected and transmitted light rays. FIG. 5A corresponds to section 5A2-5A2 of FIG. 5A2 with a cross hatch pattern and including arrows indicating transmitted light rays. Arrows 150 (FIG. 6A) illustrate light reflected by the interior surfaces 112, refracted by the base 102 and emitted by the planar surfaces 124. Arrows 152 (FIG. 6A) illustrate light refracted by the base 102 and emitted by the outer radial lens segments 128 or the inner radial lens segments 140. Arrows 154 (FIG. 6A) illustrate light refracted and emitted by the cylindrical center portion 138. Arrows 156 (FIG. 8A) illustrate light refracted by the parallel ribs 122 of the fluted lens 120.

Figure 9:
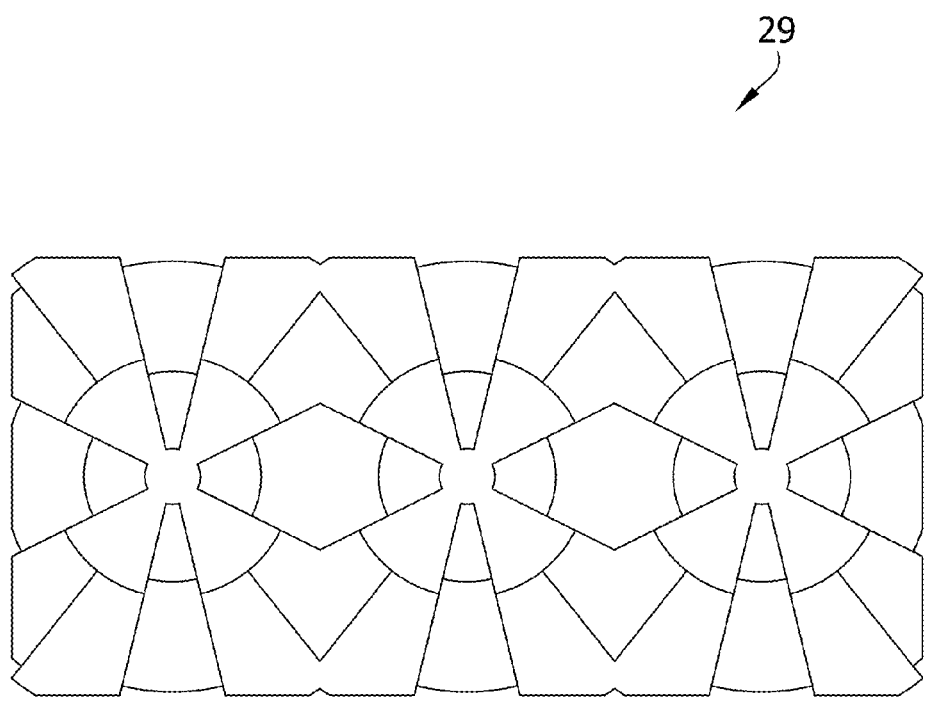
FIG. 9 is a front elevation of the three optic component 29 of FIG. 7.
Figure 9A:
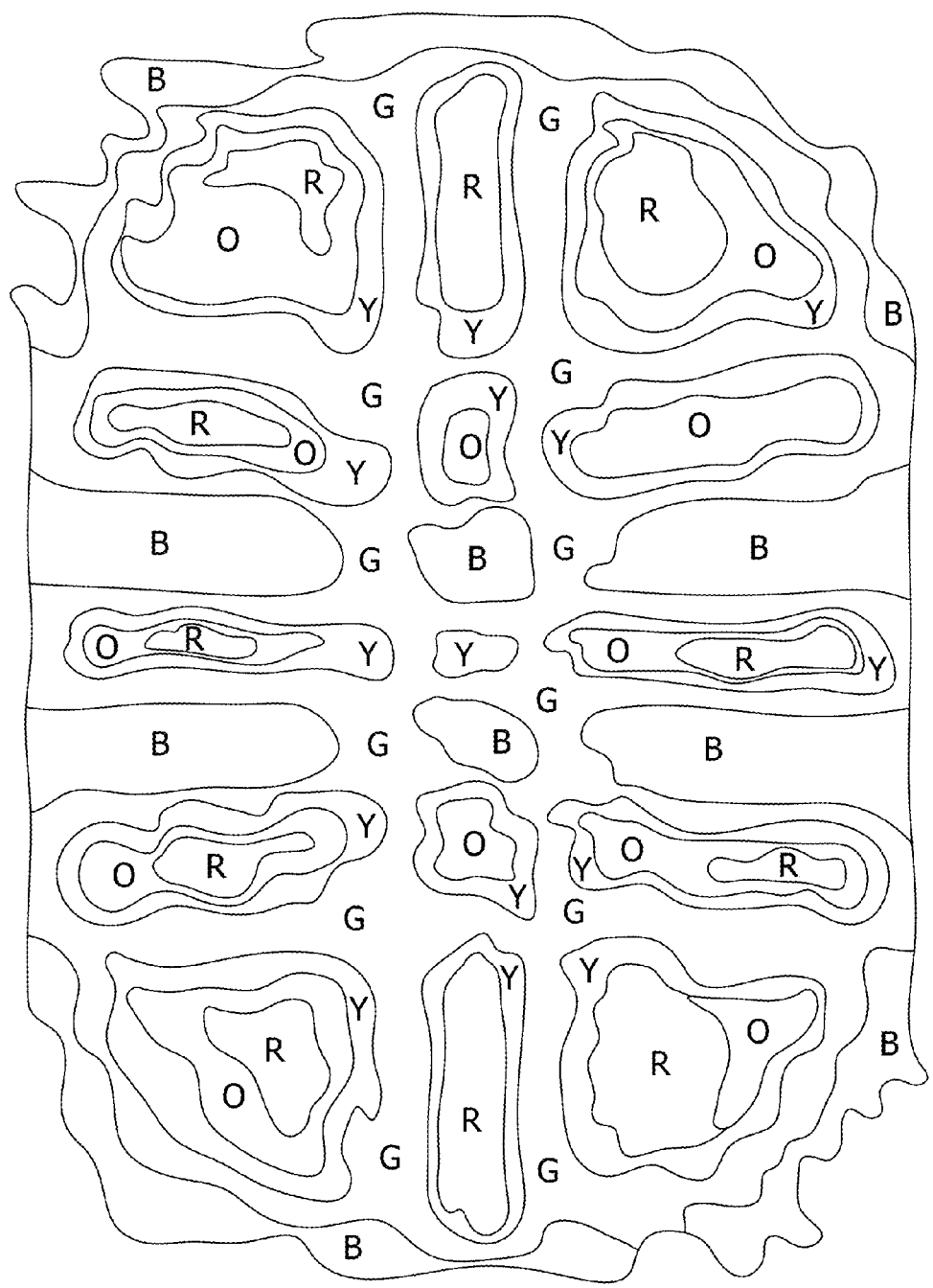
FIGS. 9A and 9B illustrate intensity diagrams of the light intensity and shape of the beam patterns generated by one example of a COB light head as illustrated in U.S. Pat. No. 8,342,725 and the optic component 28 of FIGS. 2A-8A, respectively. The labeled areas illustrate the following various intensities from low to high: blue B, green G, yellow Y, orange O, and red R.
Figure 9B:
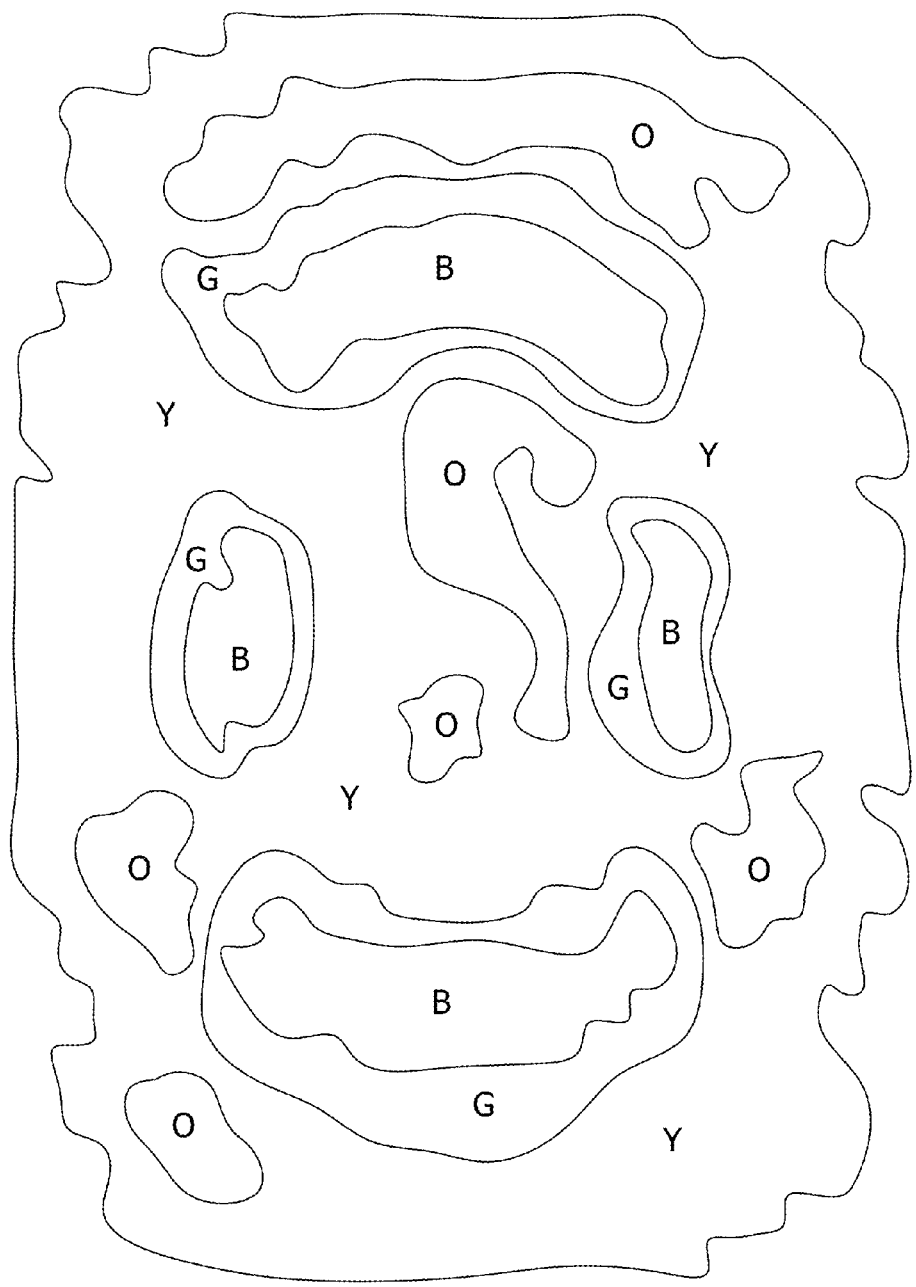
Figure 10:
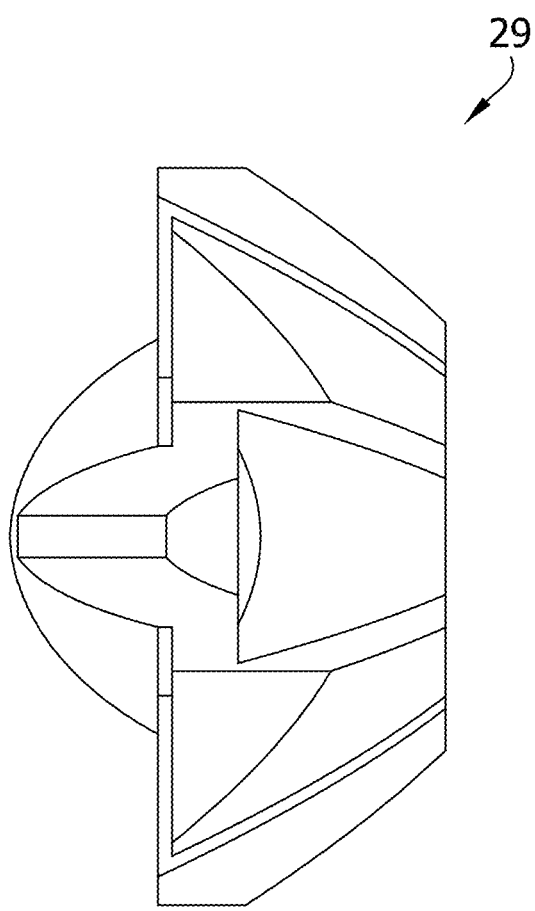
FIG. 10 is a side elevation showing the right side of the three optic component 29 of FIG. 7, the left side being a mirror image of the right side.
Figure 10A:
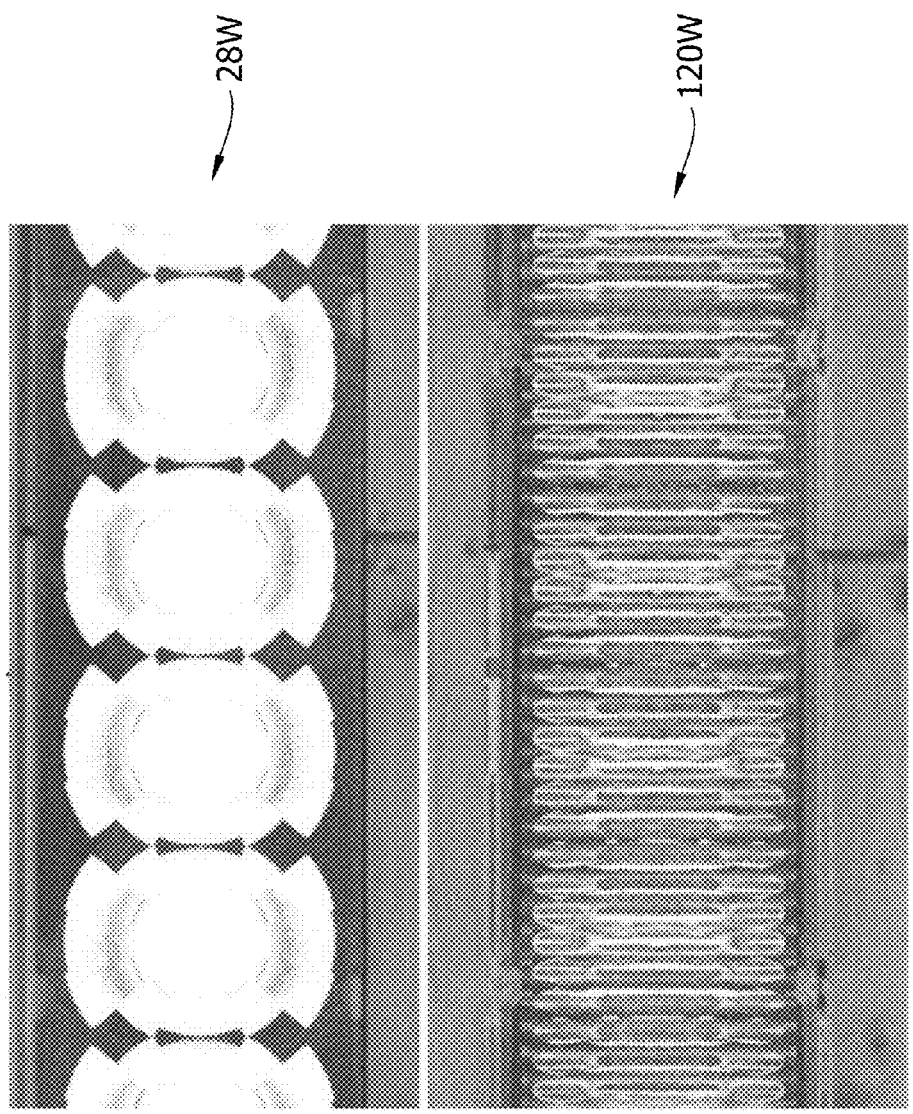
FIG. 10A is a photo illustrating the white light output 28W from multiple optic components 28/29 and the white light output 120W from multiple optic components 28/29 with fluted lens 120.

FIGS. 9A and 9B illustrate intensity diagrams of the light intensity and shape of the beam patterns generated by one example of a COB light head as illustrated in U.S. Pat. No. 8,342,725 and a light head 10 of FIGS. 2A-8A and FIGS. 1-19, respectively. The labeled areas illustrate colored areas such as generated by a light intensity diagram showing the following intensities from low to high: B=blue, G=green, Y=yellow, O=orange, and R=red. The light head 10 provides a rectangular appearance. Comparing FIG. 9A and 9B, it is noted that the intensity of light of FIG. 9B is more evenly distributed within the rectangular cross section of the beam than FIG. 9A. FIG. 9B includes fewer lower intensity areas as represented by blue B and green G than FIG. 9A and fewer higher intensity areas as represented by orange O and red R than FIG. 9A. Thus, the predominantly yellow Y intensity appearance of the beam of FIG. 9B has a more evenly distributed light intensity than the intensity appearance of the beam of FIG. 9A. FIG. 10A illustrates the white light output 28W from multiple optic components 28/29 and the white light output 120W from multiple optic components 28/29 with fluted lens 120.

In contrast, other commercial light heads generate beams which have the appearance of round dots not favored by light bar customers. The light head 12 provides a rectangular appearance at a lower cost than presently available COB technology. The combination of the planar regions 124, the outer radial segments 128, the inner radial segments 140 and the cylindrical center portion 138 contribute to and help fill the rectangular cross-sectional beam with light having substantially the same intensity and color at most locations within the rectangular beam. The even intensity and color of light over the area of the rectangular beam is present when the light source 24 is one LED 14, when the light source 24 is multiple LEDs 14 having the same color output, and/or when the light source 24 is multiple LEDs 14 having the different color output.

The light heads 12 are shorter in depth and have fewer components than presently available COB light heads. Fasteners are not needed to attach the elements of the optic component 28 since the base 102, lens structure 104 and optic cover 105 may be one piece. The walls of the optic cover 105 act as a "skirt" around the base 102 that reduces warping during molding. In addition, the configuration of the planar regions 124, the outer radial lens segments 128, the inner radial lens segments 140, the gaps 142 and the cylindrical center portion 138 facilitate molding of the light head 12 out of polycarbonate so that the outer radial lens segments side walls 144 and inner radial lens segments side walls 146 are an integral, unitary part of the light head 12. This configuration also minimizes the formation of bubbles in the light head 12 caused by shrinking of the polycarbonate during cooling.

Light heads of various colors may be assembled per customer order at the point of assembly on the light bar assembly line. The supply chain also has an option to have the light head preassembled off site depending on cost, inventory constraints, or short notice availability.

Figure 11:
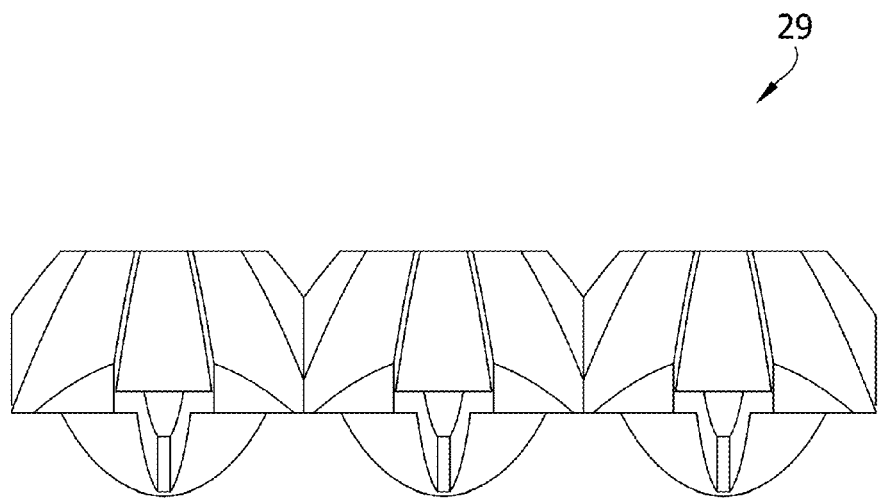
FIG. 11 is a top plan of the three optic component 29 of FIG. 7, the bottom plan view being a mirror image of the top plan.
Figure 11A:
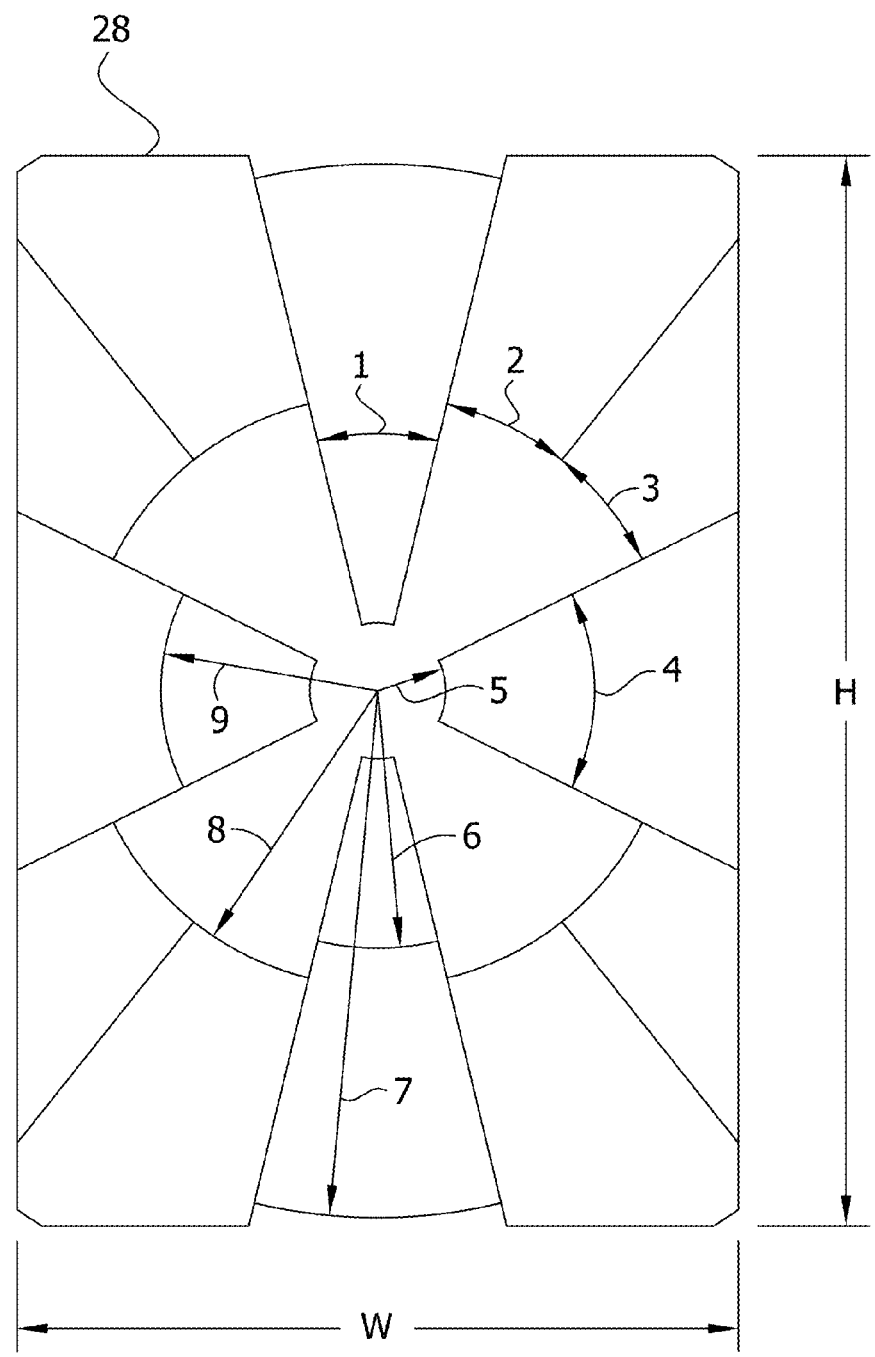
FIG. 11A is a rear elevation view corresponding to FIG. 3 of an embodiment of an optic component 28 illustrating exemplary dimensions and angles.
Figure 11B:
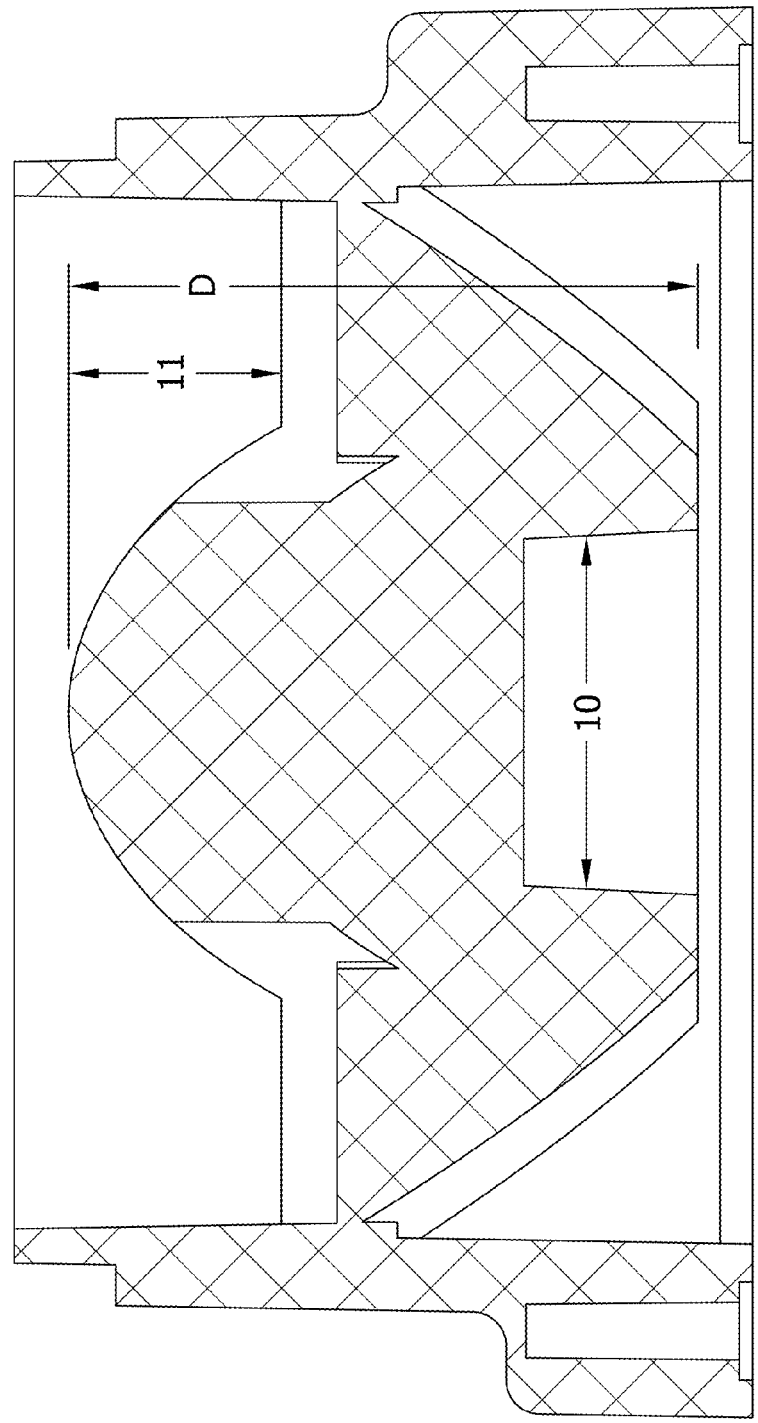
FIG. 11B is a cross sectional view taken along line 11B-11B of a fluted lens 120 of FIG. 5A1 in combination with a cross sectional view taken along line 4A4-4A4 of FIG. 4A1 of an optic component and cover illustrating exemplary dimensions.
Figure 12:
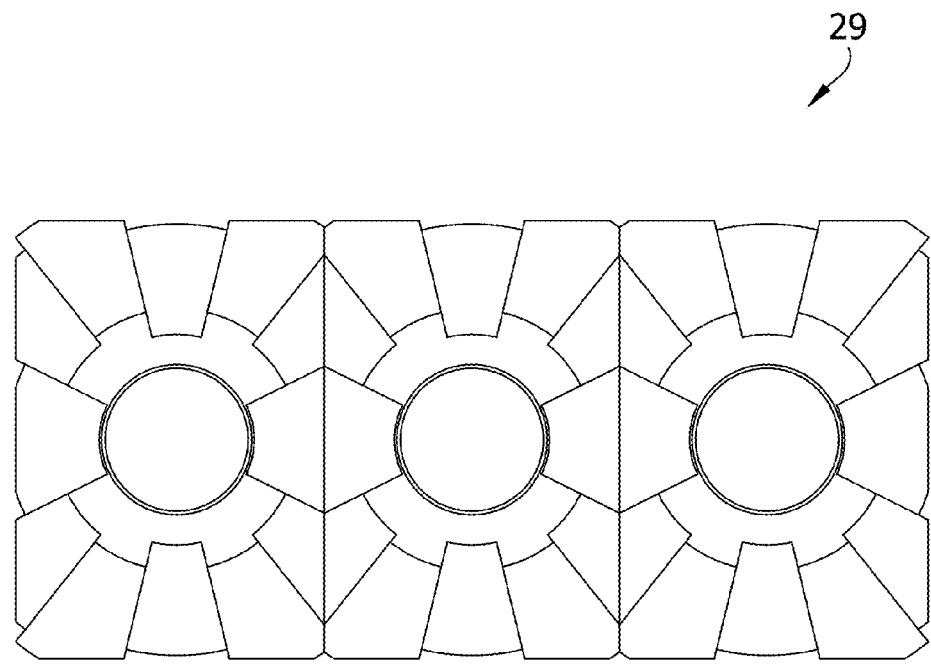
FIG. 12 is a rear elevation of the three optic component 29 of FIG. 7.
Figure 13:
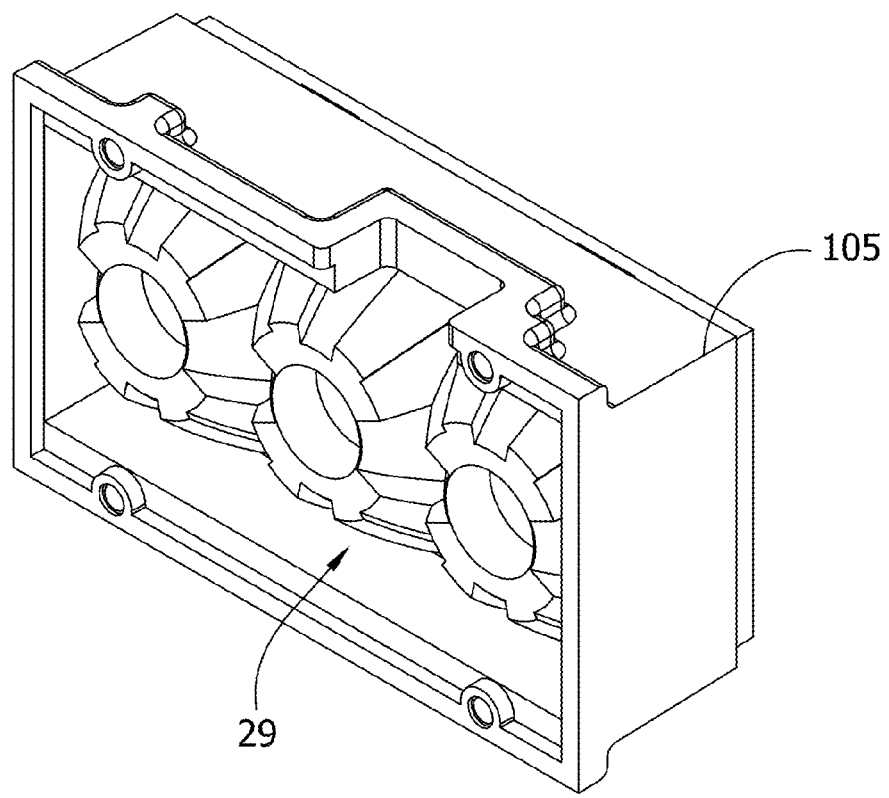
FIG. 13 is a back perspective view of an embodiment of a three optic component 29 with a cover 105 of a light head.
Figure 14:
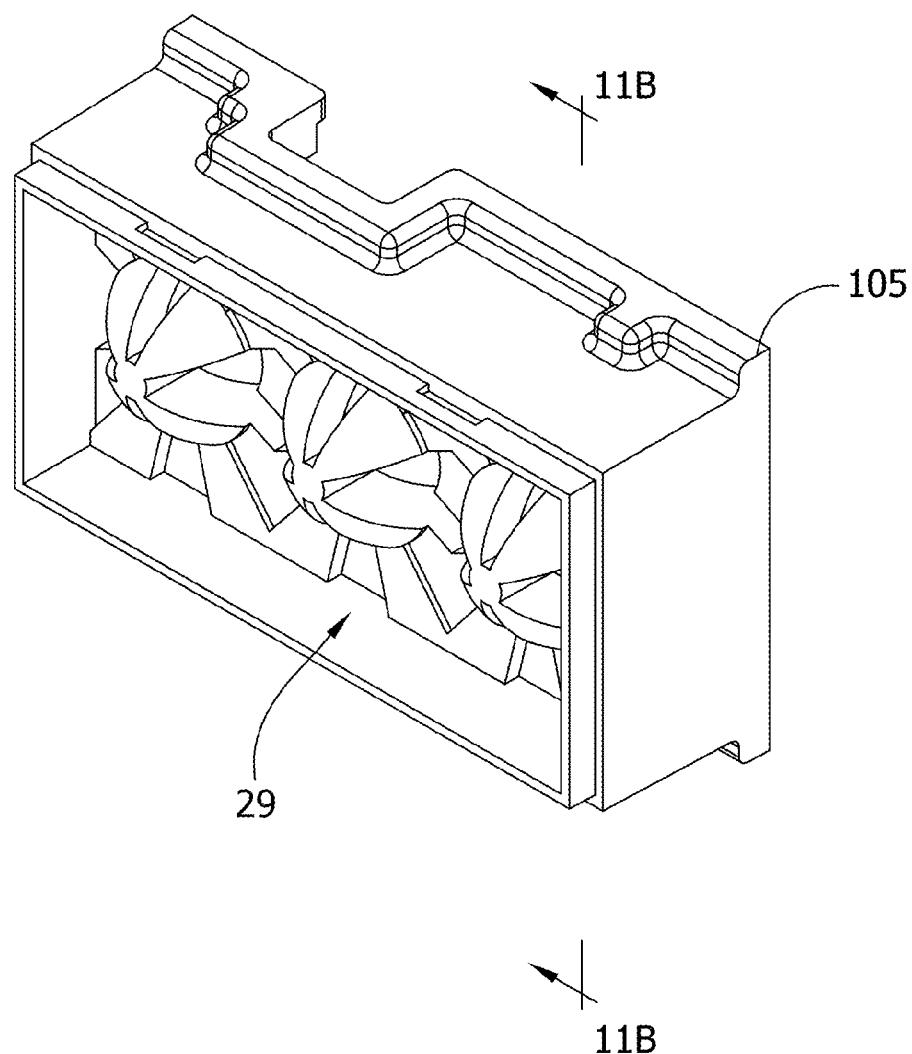
FIG. 14 is a front perspective of the three optic component 29 and cover 105 of FIG. 13.
Figure 15:
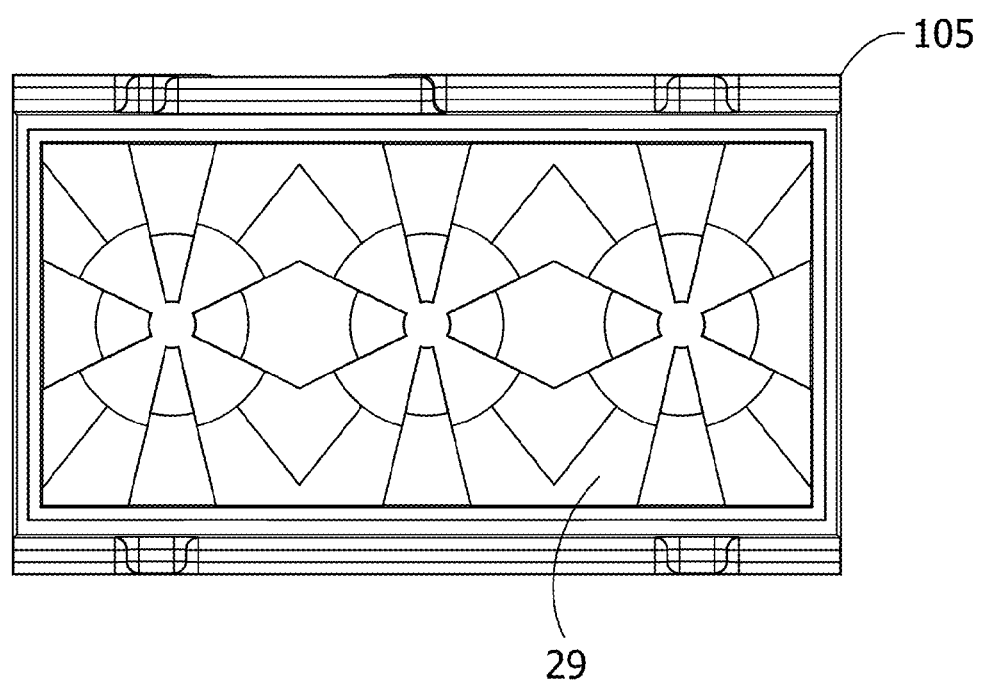
FIG. 15 is a front elevation of the three optic component 29 and cover 105 of FIG. 13.
Figure 16:
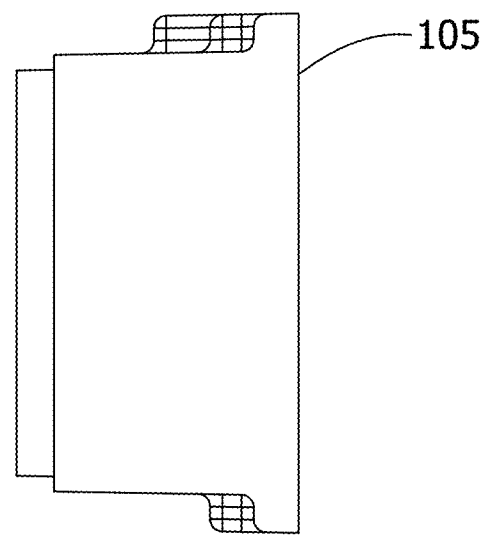
FIG. 16 is a side elevation showing the right side of the three optic component 29 and cover 105 of FIG. 13, the left side being a mirror image of the right side.
Figure 17:
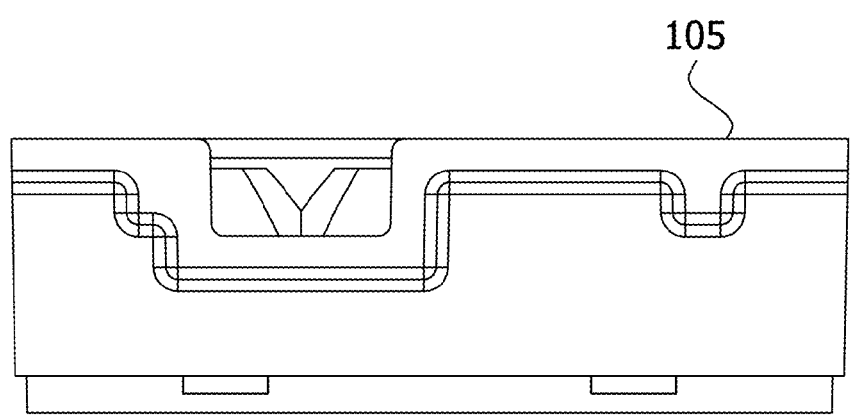
FIG. 17 is a top plan of the three optic component 29 and cover 105 of FIG. 13.
Figure 18:
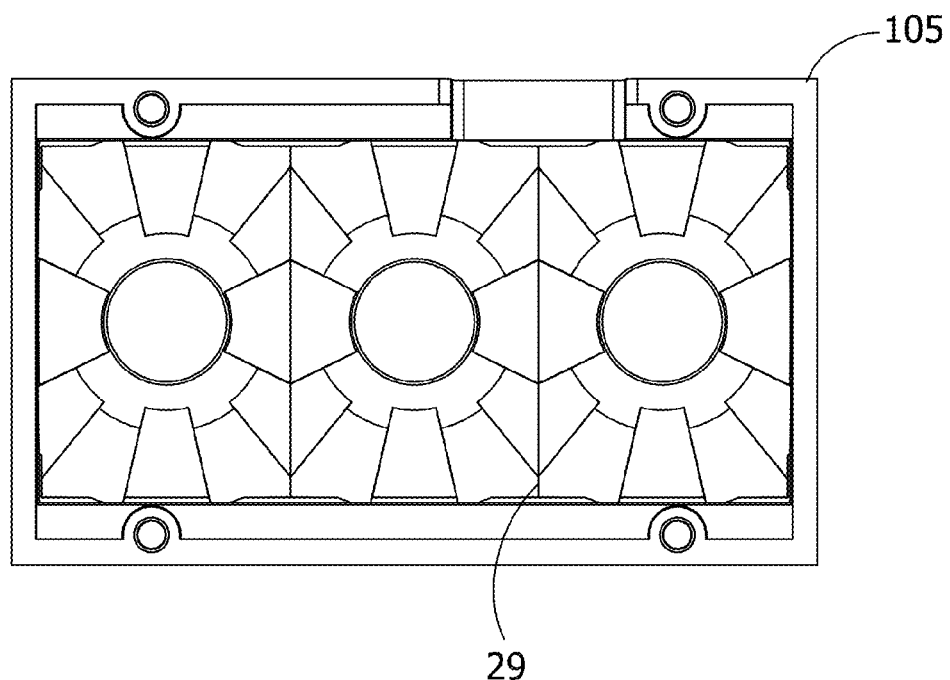
FIG. 18 is a rear elevation of the three optic component 29 and cover 105 of FIG. 13.
Figure 19:
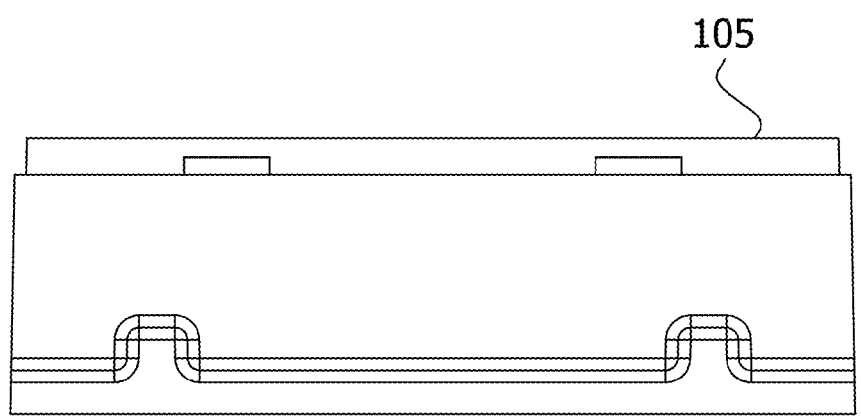
FIG. 19 is a bottom plan of the three optic component 29 and cover 105 of FIG. 13.

FIGS. 11A-11B illustrate exemplary dimensions and angles for the optic component 28. FIG. 11A is a rear elevation view of an optic component illustrating exemplary dimensions and angles. FIG. 11B is a cross sectional view taken along line 5A2-5A2 of FIG. 5A1 in combination with a cross sectional view taken along line 4A2-4A2 of FIG. 4A1 of an optic component and cover illustrating exemplary dimensions.

In one form, angles can have an impact on the efficiency and performance of the optic component 28. For example, the angles illustrated in FIGS. 11A-11B are an exemplary illustration of one embodiment. Such angles may vary ±25% without significantly reducing efficiency and performance advantages over other existing products. For example, FIG. 11A illustrates the following angles:

Angle 1=27.1°
Angle 2=25.0°
Angle 3=25.0°
Angle 4=52.9°

In one form, dimensions can have an impact on the efficiency and performance of the optic component 28. For example, the dimensions illustrated in FIGS. 11A-11B are an exemplary illustration of one embodiment. Such dimensions may vary ±50% without significantly reducing efficiency and performance advantages over other existing products. For example, FIG. 11A illustrates the following dimensions:

Radius 5=0.077" (1.96 mm)
Radius 6=0.298" (7.57 mm)
Radius 7=0.610" (15.5 mm)
Radius 8=0.342" (8.69 mm)
Radius 9=0.251" (6.38 mm)
Height H=1.240" (31.5 mm)
Width W=0.910" (23.11 mm)

For example, FIG. 11B illustrates the following dimensions:

Radius 10=0.212" (5.38 mm)
Height 11=0.249" (6.32 mm)
Depth D=0.732" (18.59 mm)

As the optic component increases in size to 50% greater than illustrated, molding limitations impact the ability to manufacture such larger optic components. In addition, larger components when molded may be subject to excessive shrinkage which cases bubbles or voids to form within the optic component, thereby reducing its performance and efficiency. Conversely, as the optic component decreases in size to 50% less than illustrated, the minimum size of the cavity 106 to accommodate one or more LEDs or other light sources tends to reduce performance and efficiency.

For example, an optic component 28 as illustrated in FIGS. 11A-11B can have a width W=0.910" (23.11 mm), a height H=1.240" (31.5 mm) and a depth 0=0.732" (18.59 mm), as noted above. In one form, a minimum size for an optic component would be 50% of the illustrated dimensions, namely a minimum width W =0.455" (11.56 mm), a minimum height H=0.620" (15.75 mm) and a minimum depth of 0.366" (9.3 mm). Similarly, in one form, a maximum size for a three-element optic would be 150% of the illustrated dimensions, namely a maximum width W =1.365" (34.67 mm), a maximum height of 1.860" (47.24 mm) and a maximum depth of 1.098" (27.89 mm).

FIGS. 7-19, 1A-4A5, 6A and 7A illustrate a multiple light head having three (3) optic components 28 in a linear row, side by side. In addition to a single optic component 28 as illustrated in FIGS. 1-6, 11A and 11B, it is contemplated that a multiple light head can include two or more optic components 28 in a linear, horizontal row; and/or two or more optic components 28 in a linear, vertical column; and/or four or more optic components 28 in two or more rows and two or more columns. For example, a 4×3 array of optic components 28 including four columns and three rows with four optic components in each row and three optic components in each column may be used as a surface mounted, stationary perimeter light for a vehicle. Because of the evenly distributed intensity of light in each rectangular beam of each optic component, a 4×3 array would appear to a remote observer to produce a single rectangular light beam, not twelve separate, rectangular beams.

The ratio of the width of each optic component 28 to the height of the component also impacts efficiency and performance. As illustrated in FIG. 11A, the width of the optic component is W=0.910", (23.1 mm) compared to a height H=1.240" (31.5 mm) so that the illustrated width to height ratio is W/H=0.910"/1.240" (23.1 mm/31.5 mm), which equals 0.734. In one exemplary form, it is contemplated that the width to height ratio would be at least 0.50. In another exemplary form, it is contemplated that the width to height ratio would be not greater than 1.50. Ratios of less than 0.50 or greater than 1.50 tend to have reduced performance and efficiency and tend to provide rectangular beams with uneven light intensity distribution across the rectangular cross section of the beam. Such uneven light intensity appears to an observer as a spot rather than a rectangle with less brightness at its perimeter.

REFERENCE CHARACTER LIST:

light bar 10 light head 12
LEDs 14 '
housing, generally indicated at 16
heat sink 20
ground connection screws 21
circuit board 22
light source 24
light source driver circuit 26
optic component 28
three optic component 29
outer lens 32
collimating base 102
collimating lens structure 104
optic cover 105
cavity 106
inner surface 108
outer transmissive surface 110
interior surfaces 112
an inner surface 114
opposing sides 116
opposing ends 118
fluted lens 120
parallel ribs 122
planar regions 124
central axis 126
outer radial lens segments 128
outer surfaces 130
bar edges 132
sector shaped regions 134
planes 136
cylindrical center portion 138
inner radial lens segments 140
gaps 142
outer radial lens segments side walls 144
inner radial lens segments side walls 146
Radial planes 148
Arrow 149 pointing inward (FIG. 6A)
Arrows 150 of light reflected by the interior surfaces 112, refracted by the base 102 and emitted by the planar surfaces 124
Arrows 152 of light refracted by the base 102 and emitted by the outer radial lens segments 128 or the inner radial lens segments 140
Arrows 154 of light refracted and emitted by the cylindrical center portion 138

Arrows 156 of light refracted by the parallel ribs 122 of the fluted lens 120

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A light bar comprising:
a plurality of light heads, each light head comprising:
a heat sink;

a circuit board in heat transfer communication with the heat sink, the circuit board having an electrically conductive pathway;

a light source mounted on the circuit board such that heat generated by the light source when energized is transferred via the circuit board to the heat sink, the light source electrically connected to the electrically conductive pathway of the circuit board;

a collimating base having a cavity for receiving the light source, the collimating base having an inner surface positioned adjacent the circuit board, interior surfaces, and an outer transmissive surface, the interior surfaces reflecting light generated by the light source, and the light reflected by the interior surfaces propagating toward the outer transmissive surface and emitted by the outer transmissive surface as substantially collimated light; and a collimating lens structure projecting away from the outer transmissive surface of the collimating base and comprising first spaced-apart radial lens segments and second spaced-apart radial lens segments having respective first and second transmissive surfaces from which light generated by the light source is emitted as substantially collimated light, the collimating lens structure in optical communication with the cavity and having a central axis from which the first spaced-apart radial lens segments extend and from which the second spaced-part radial lens segments extend, the first transmissive surfaces of the first radial lens segments located farther from and the second transmissive surfaces of the second radial lens segments located nearer to the cavity in the collimating base, and the substantially collimated light emitted by the outer transmissive surface of the collimating base and the first and second transmissive surfaces of the collimating lens structure combine to form a substantially collimated transmitted light beam.

2. The light bar of claim 1 wherein the outer transmissive surface of the collimating base comprises planar regions in one or more planes perpendicular to the central axis of the collimating lens structure extending generally perpendicular to the circuit board.

3. The light bar of claim 1 wherein the collimating lens structure comprises a generally dome-shaped structure.

4. The light bar of claim 3 wherein the first spaced-apart radial lens segments are arranged at locations around the central axis extending generally perpendicular to the circuit board, the first spaced-apart radial lens segments having outer surfaces terminating in base edges at the outer transmissive surface of the collimating base.

5. The light bar of claim 4 wherein the outer transmissive surface of the collimating base includes sector shaped regions extending radially from the base edges of the first spaced-apart radial lens segments in one or more planes generally perpendicular to the central axis.

6. The light bar of claim 4 wherein the collimating lens structure further comprises a generally cylindrical center portion along the central axis and the second spaced-apart radial lens segments are arranged at locations around the central axis, the second spaced-apart radial lens segments extending radially outwardly from the cylindrical central portion in gaps between the first spaced-apart radial lens segments.

7. The light bar of claim 6 wherein second spaced-apart radial lens segments are disposed between side walls of the first spaced-apart radial lens segments.

8. The light bar of claim 7 wherein the side walls of the first spaced-apart radial lens segments are co-planar with side walls of the second spaced-apart radial lens segments and wherein the side walls of both the first spaced-apart radial lens segments and the second spaced-apart radial lens segments lie in radial planes.

9. The light bar of claim 4 wherein the collimating lens structure further comprises a generally cylindrical center portion along the central axis, and wherein the first spaced-apart radial lens segments and second spaced-apart radial lens segments extend radially outwardly from the cylindrical central portion.

10. The light bar of claim 1 wherein the substantially collimated transmitted light beam is in a form of a generally rectangular beam of light-having a generally rectangular cross-section that is perpendicular to the central axis of the collimating lens structure.

11. The light bar of claim 1 wherein the light source comprises a light emitting diode (LED) mounted on the circuit board such that heat generated by the LED when energized is transferred to the heat sink, the LED having an LED chip electrically connected to the electrically conductive pathway of the circuit board.

12. The light bar of claim 1 wherein the light source comprises a plurality of light emitting diodes (LEDs) mounted on the circuit board such that heat generated by the LEDs when energized is transferred to the heat sink, each of the LEDs having an LED chip electrically connected to the electrically conductive pathway of the circuit board, the LEDs when energized emitting light having different colors.

13. The light bar of claim 1 further comprising an outer lens having an inner surface positioned adjacent the collimating base and the collimating lens structure, the outer lens transmitting the substantially collimated light emitted by the collimating base and the collimating lens structure.

14. The light bar of claim 13 wherein the outer lens has opposing sides and opposing ends and comprises at least one of a holographic elliptical diffuser or a fluted lens having parallel ribs substantially perpendicular to the sides of the outer lens.

15. The light bar of claim 1 further comprising an outer lens through which the substantially collimated transmitted light beam propagates, the outer lens having an inner surface positioned adjacent the collimating base and the collimating lens structure and having light directing properties that enhance the substantially collimated transmitted light beam to appear as a rectangular beam having a substantially constant, even intensity at various points within a plane perpendicular to the central axis of the collimating lens structure.

* * * * *